United States Patent
Kelly et al.

(10) Patent No.: US 9,597,862 B2
(45) Date of Patent: Mar. 21, 2017

(54) PROTECTION BARRIERS AND METHODS FOR MAKING AND USING SAME

(71) Applicant: Georgia-Pacific LLC, Atlanta, GA (US)

(72) Inventors: John P. Kelly, Sugar Hill, GA (US); Richard D. Jordan, Lawrenceville, GA (US); Ronald C. Norris, Jr., Loganville, GA (US); Frederick J. Curcio, Livermore, CA (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 241 days.

(21) Appl. No.: 14/624,622

(22) Filed: Feb. 18, 2015

(65) Prior Publication Data

US 2015/0231867 A1    Aug. 20, 2015

Related U.S. Application Data

(60) Provisional application No. 61/941,430, filed on Feb. 18, 2014, provisional application No. 62/033,402, filed on Aug. 5, 2014.

(51) Int. Cl.
*B32B 29/00* (2006.01)
*B32B 3/28* (2006.01)
(Continued)

(52) U.S. Cl.
CPC ............. *B32B 29/005* (2013.01); *B32B 3/28* (2013.01); *B32B 7/12* (2013.01); *B32B 29/02* (2013.01); *B32B 29/08* (2013.01); *D21H 21/16* (2013.01); *D21H 27/32* (2013.01); *D21H 27/40* (2013.01); *B32B 2307/3065* (2013.01); *B32B 2307/558* (2013.01); *B32B 2307/584* (2013.01); *B32B 2471/00* (2013.01); *B32B 2571/00* (2013.01); *Y10T 29/49826* (2015.01);
(Continued)

(58) Field of Classification Search
CPC ....... B32B 3/28; B32B 2250/04; B32B 29/05; B32B 29/08; B32B 29/02; B32B 2307/584; B32B 2307/558; B32B 2307/3065; B32B 2471/00; B32B 2571/00; D21H 27/32; D21H 27/40; D21H 21/16
See application file for complete search history.

(56) References Cited

U.S. PATENT DOCUMENTS

| | | | |
|---|---|---|---|
| 2003/0033775 A1* | 2/2003 | Nordgren | B32B 3/266 52/309.8 |
| 2007/0130867 A1* | 6/2007 | Flaherty | B32B 21/06 52/483.1 |
| 2008/0250729 A1* | 10/2008 | Kriesel | E04F 15/20 52/145 |

OTHER PUBLICATIONS

"Ram Board Temporary Floor Protection and Other Jobsite Protection Products for Construction Contractors", www.ramboard.com, retrieved on Feb. 27, 2015.

* cited by examiner

*Primary Examiner* — Donald J Loney
(74) *Attorney, Agent, or Firm* — Ram W. Sabnis

(57) ABSTRACT

Protection barriers, such as floor protection barriers, and methods for making and using same. The protection barrier can include a base sheet and an energy absorbing layer. The base sheet can have two or more paperboard layers and one or more sizing layers. A first paperboard layer can form a first surface of the base sheet, a second paperboard layer can form a second surface of the base sheet, and the one or more sizing layers can be disposed between the first and second (Continued)

paperboard layers. The energy absorbing layer can be secured to the second paperboard layer.

20 Claims, 5 Drawing Sheets

(51) Int. Cl.
*B32B 29/02* (2006.01)
*B32B 7/12* (2006.01)
*B32B 29/08* (2006.01)
*D21H 27/32* (2006.01)
*D21H 27/40* (2006.01)
*D21H 21/16* (2006.01)

(52) U.S. Cl.
CPC ...... *Y10T 428/24694* (2015.01); *Y10T 428/26* (2015.01); *Y10T 428/266* (2015.01); *Y10T 428/31511* (2015.04); *Y10T 428/31515* (2015.04); *Y10T 428/31591* (2015.04); *Y10T 428/31848* (2015.04); *Y10T 428/31895* (2015.04); *Y10T 428/31964* (2015.04); *Y10T 428/31975* (2015.04); *Y10T 428/31993* (2015.04)

PROTECTION BARRIERS AND METHODS FOR MAKING AND USING SAME

CROSS-REFERENCE TO RELATED APPLICATIONS

This application claims priority to U.S. Provisional Patent Application No. 62/033,402, filed on Aug. 5, 2014, and claims priority to U.S. Provisional Patent Application No. 61/941,430, filed on Feb. 18, 2014, which are incorporated by reference herein.

BACKGROUND

Field

Embodiments described generally relate to protection barriers, such as floor protection barriers, and methods for making and using same.

Description of the Related Art

During construction, renovation, and/or other activities within a building or other structure one or more finished surfaces therein frequently need to be protected to reduce or prevent scratching, marring, or other damage. Attempts to protect finished surfaces have included placing sheets or layers of plastic, cloth, or paper on the finished surface to serve as a temporary barrier. While providing some protection to the covered finished surface, these layers of plastic, cloth, or paper do not always provide the desired level of protection to the finished surface intended to be protected.

There is a need, therefore, for improved protection barriers that can be disposed on floors, decks, counter-tops, or other surfaces of a building or other structure.

SUMMARY

Protection barriers, such as floor protection barriers, and methods for making and using same are provided. The protection barrier that can include a base sheet and an energy absorbing layer. The base sheet can have two or more paperboard layers and one or more sizing layers. A first paperboard layer can form a first surface of the base sheet, a second paperboard layer can form a second surface of the base sheet, and the one or more sizing layers can be disposed between the first and second paperboard layers. The energy absorbing layer can be secured to the second paperboard layer. The protection barrier can have a water vapor transmission rate of about 5 g/645.2 cm$^2$/24 hr to about 150 g/645.2 cm$^2$/24 hr, as measured according to ASTM E96M-14, Procedure A. The sizing layer can include an average oil and grease resistance value of about 6 or greater, as measured according to TAPPI T-559 standard test for Grease Resistance for Paper and Paperboard. The protection barrier can include an oil and grease resistance flotation value of about 3 hours or greater, as measured according to the Georgia-Pacific Flotation Paper Saturation Test STP-415.

The protection barrier can be made by forming the base sheet that can include the first and second paperboard layers and one or more sizing layers and securing the energy absorbing layer to the second paperboard layer on the base sheet.

DETAILED DESCRIPTION

Figure 1:
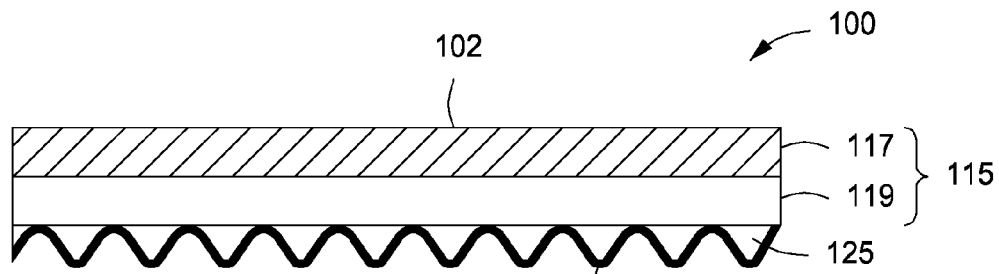
FIG. 1 depicts a cross-sectional view of an illustrative protection barrier that includes a sizing layer, a paperboard layer, and an energy absorbing layer, according to one or more embodiments described.

FIG. 1 depicts a cross-sectional view of an illustrative protection barrier 100 that can include at least one base sheet 115 and at least one energy absorbing layer 125 secured to the base sheet 115. The base sheet 115 can include at least one layer 117, such as a paperboard layer, and at least one sizing layer 119. The sizing layer 119 can be disposed between the layer 117 and the energy absorbing layer 125.

Figure 2:
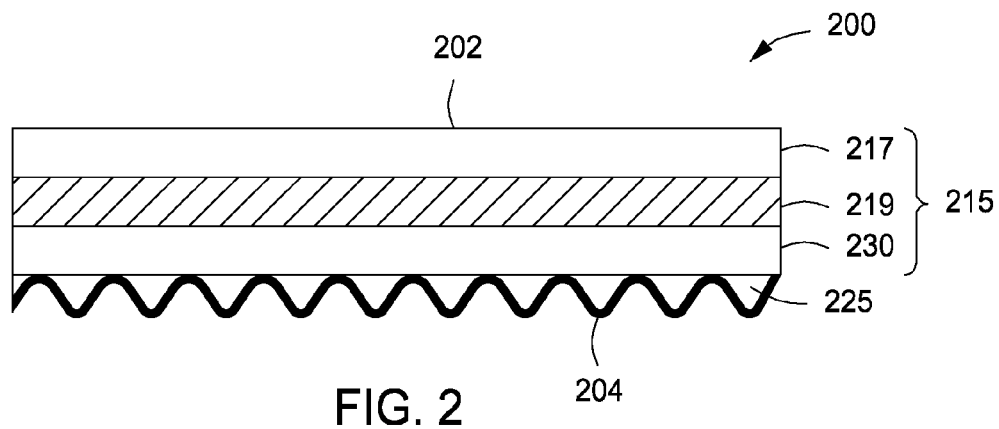
FIG. 2 depicts a cross-sectional view of an illustrative protection barrier that includes a sizing layer, at least two paperboard layers, and an energy absorbing layer, according to one or more embodiments described.

FIG. 2 depicts a cross-sectional view of an illustrative protection barrier 200 that can include at least one base sheet 215 and at least one energy absorbing layer 225. The base sheet 215 can include at least one first layer 217, at least one second layer 230, and at least one sizing layer 219. The sizing layer 219 can be disposed between the first layer 217 and the second layer 230. The second layer 230 can be disposed between the sizing layer 219 and the energy absorbing layer 225. The protection barrier 100 can have a first or "upper" surface 102 and a second or "lower" surface 104 (as shown in FIG. 1), and similarly, the protection barrier 200 can have a first or "upper" surface 202 and a second or "lower" surface 204 (as shown in FIG. 2).

The layers 117, 217, and/or 230 can be or include one, two, three, four, five, six, seven, eight, nine, ten, eleven, twelve, thirteen, fourteen, or more independent, discrete, individual, or otherwise separate paperboard layers. The sizing layers 119 and/or 219 can be or include one, two, three, four, five, six, seven, eight, nine, ten, eleven, twelve, thirteen, fourteen, or more independent, discrete, individual, or otherwise separate sizing layers. As such, the base sheet 115 can include two or more separate layers (at least one layer 117 and at least one sizing layer 119) and the base sheet

215 can include three or more separate layers (at least one first layer 217, at least one sizing layer 219, and at least one second layer 230).

The layers 117, 217, and/or 230 can be or include a plurality of natural fibers, synthetic fibers, recycled fibers, or any mixture thereof. The natural fibers and/or the recycled fibers can be or include lignocellulosic fibers. The recycled fibers can be or include natural fibers and/or synthetic fibers. The layers 117, 217, and/or 230 can be or include a paperboard. Illustrative paperboards can include, but are not limited to, gypsum wallboard facing paper, cardboard, paperboard, kraft paper, manila paper, newsliner paper, nylon fibers, polyester fibers, polypropylene fibers, polyethylene fibers, rayon fibers, or any mixture thereof.

The layers 117, 217, and/or 230 can be or include one or more films or sheets of material. For example, the layers 117, 217, and/or 230 can be or include one or more polymer films. Illustrative polymer films can include, but are not limited to, nylon films, polyester films, polypropylene films, polyethylene films, rayon films, or any mixture thereof. Other polymers that can be included in the layers 117, 217, and/or 230 as fibers or films can include, but are not limited to, polyethylene copolymers, polypropylene copolymers, or a mixture thereof. Suitable comonomers can include, but are not limited to, $C_2$ to $C_{20}$ olefins. Accordingly, the term "copolymer" includes polymers composed of two or more monomers. The comonomer can be linear or branched or can include two unsaturated carbon-carbon bonds (dienes). Examples of suitable comonomers can include, but are not limited to, ethylene; propylene; 1-butene; 3-methyl-1-butene; 3,3-dimethyl-1-butene; 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; styrene; or any combination or mixture thereof. Several exemplary comonomers can be or include ethylene, 1-butene, 1-hexene, 1-octene, or any mixture thereof.

If the layers 117, 217, and/or 230 include two or more separate paperboard layers, the two or more paperboard layers can be affixed, adhered, attached, fastened, or otherwise secured to one another. For example, a plurality of paperboard layers can be compressed together causing fibers from each adjacent layer to entangle or otherwise contact one another such that adjacent or adjoin layers become at least partially secured to one another. In another example, one or more adhesives or binders can be used to secure a plurality of separate paperboard layers to one another.

The sizing layers 119 and/or 219 can be similar to the layers 117, 217, and/or 230, but can also include one or more sizing agents. For example, the sizing layers 119 and/or 219 can include sizing agent and a plurality of natural fibers, synthetic fibers, recycled fibers, or any mixture thereof. The sizing agent can be or include, but is not limited to, one or more clay-based materials, rosins, rosin-based compounds, latex, latex-based materials, starches, modified starches, gelatins, waxes, acrylic copolymers, alkyl ketene dimers (AKD), alkyl succinic anhydrides (ASA), polyamide-epihalohydrin (PAE) resins (e.g., polyamidoamine-epichlorohydrin), styrene maleic anhydride (SMA) resins, styrene maleimide (SMI) resins, styrene acrylic emulsions (SAE), styrene acrylic acid (SAA) resins, ethylene acrylic acid (IAA) resins, polyurethane (PUR) resins, glyoxalated polyacrylamide (GPAM) resins, or any mixture thereof. The sizing agent can be substantially uniformly or non-uniformly dispersed within the sizing layers 119 and/or 219.

If the sizing layers 119 and/or 219 include two or more separate sizing layers, the two or more sizing layers can be affixed, adhered, attached, fastened, or otherwise secured to one another. For example, a plurality of sizing layers can be compressed together causing fibers from each adjacent layer to entangle or otherwise contact one another such that adjacent or adjoin layers become at least partially secured to one another. In another example, one or more adhesives or binders can be used to secure a plurality of separate sizing layers to one another.

The layers 117, 217, and/or 230 can have a water absorbency of about 0.01 g/g (g of water per 1 g of the paperboard layer at about 23° C.), about 0.03 g/g, about 0.05 g/g, about 0.07 g/g, about 0.1 g/g, about 0.15 g/g, about 0.2 g/g, about 0.3 g/g, about 0.5 g/g, about 0.7 g/g, about 1 g/g, about 1.3 g/g, or about 1.5 g/g to about 2 g/g, about 2.5 g/g, about 3 g/g, about 3.5 g/g, about 4 g/g, about 4.5 g/g, about 5 g/g, about 6 g/g, about 7 g/g, about 8 g/g, about 9 g/g, or about 10 g/g. The layers 117, 217, and/or 230 can have a water absorbency of at least 0.05 g/g, at least 0.07 g/g, at least 0.1 g/g, at least 0.13 g/g, at least 0.15 g/g, at least 0.2 g/g, at least 0.3 g/g, at least 0.4 g/g, at least 0.5 g/g, at least 0.6 g/g, at least 0.7 g/g, at least 0.8 g/g, at least 0.9 g/g, at least 1 g/g, or at least 1.1 g/g and up to about 1.5 g/g, about 2 g/g, about 2.5 g/g, about 3 g/g, about 4 g/g, about 5 g/g, about 6 g/g, or about 7 g/g. For example, the layers 117, 217, and/or 230 can have a water absorbency of about 0.01 g/g to about 5 g/g, about 0.1 g/g to about 7 g/g, about 0.1 g/g to about 6 g/g, about 0.1 g/g to about 5 g/g, about 0.1 g/g to about 4 g/g, about 0.1 g/g to about 3 g/g, about 1 g/g to about 7 g/g, about 1 g/g to about 6 g/g, about 1 g/g to about 5 g/g, about 1 g/g to about 4 g/g, or about 1 g/g to about 3 g/g. The water absorbency can be measured according to the Cobb test for a time of 180 seconds and a temperature of about 23° C.

The layers 117, 217, and/or 230 can have a void volume ratio of about 1, about 2, about 3, or about 4 to about 7, about 8, about 9, or about 10. For example, the layers 117, 217, and/or 230 can have a void volume ratio of at least 1, at least 1.5, at least 2, at least 2.5, at least 3, at least 3.5, or at least 4 and up to about 7, about 8, about 9, or about 10.

The layers 117, 217, and/or 230 can have a thickness of about 0.001 mm, about 0.005 mm, about 0.01 mm, about 0.02 mm, about 0.03 mm, about 0.04 mm, about 0.05 mm, about 0.1 mm, or about 0.15 mm to about 0.25 mm, about 0.5 mm, about 0.75 mm, about 1 mm, about 1.25 mm, about 1.5 mm, about 1.75 mm, about 2 mm, or greater. For example, each of the layers 117, 217, and/or 230 can have a thickness of about 0.05 mm to about 2 mm, about 0.1 mm to about 2 mm, about 0.2 mm to about 2 mm, about 0.05 mm to about 1 mm, about 0.1 mm to about 0.25 mm, about 0.1 mm to about 0.25 mm, about 0.1 mm to about 1 mm, about 0.2 mm to about 1 mm, or about 0.5 mm to about 1 mm.

The layers 117, 217, and/or 230 can have a basis weight of about 1 $g/m^2$, about 5 $g/m^2$, about 10 $g/m^2$, about 15 $g/m^2$, about 20 $g/m^2$, about 25 $g/m^2$, or about 30 $g/m^2$, to about 60 $g/m^2$, about 70 $g/m^2$, about 80 $g/m^2$, about 90 $g/m^2$, about 100 $g/m^2$, or about 150 $g/m^2$. For example, each of the layers 117, 217, and/or 230 can have a basis weight of about 1 $g/m^2$ to about 150 $g/m^2$, about 5 $g/m^2$ to about 100 $g/m^2$, about 10 $g/m^2$ to about 100 $g/m^2$, about 20 $g/m^2$ to about 100 $g/m^2$, about 30 $g/m^2$ to about 100 $g/m^2$, about 10 $g/m^2$ to about 90 $g/m^2$, about 10 $g/m^2$ to about 80 $g/m^2$, about 20 $g/m^2$ to about 80 $g/m^2$, about 30 $g/m^2$ to about 80 $g/m^2$, or about 40 $g/m^2$ to about 60 $g/m^2$.

The sizing layers 119 and/or 219 can have a water vapor transmission rate of about 5, about 10, or about 15 grams per 645.16 square centimeters per day (g/645.2 cm$^2$/24 hr) to about 20, about 25, about 30, about 35, about 40, about 45, about 50 g/645.2 cm$^2$/24 hr, or greater, as measured according to ASTM E96/E96M-14, Procedure A. In some examples, the sizing layers 119 and/or 219 can have a water vapor transmission rate of about 5 to about 50, about 10 to about 40, about 15 to about 35, or about 20 to about 30 g/645.2 cm$^2$/24 hr, as measured according to ASTM E96M-14, Procedure A.

The sizing layers 119 and/or 219 can have a dry rigidity of about 175, about 185, about 195, about 205, or about 215 grams per 6.35 mm of deflection to about 220, about 230, about 240, about 250, about 260, about 262, about 265, or about 270 grams per 6.35 mm of deflection. For example, the sizing layers 119 and/or 219 can have a dry rigidity of about 175 to about 270, about 175 to about 262, about 185 to about 270, or about 185 to about 265 grams per 6.35 mm of deflection.

The sizing layers 119 and/or 219 can have a basis weight of about 1 g/m$^2$, about 5 g/m$^2$, about 10 g/m$^2$, about 15 g/m$^2$, about 20 g/m$^2$, about 25 g/m$^2$, or about 30 g/m$^2$, to about 60 g/m$^2$, about 70 g/m$^2$, about 80 g/m$^2$, about 90 g/m$^2$, about 100 g/m$^2$, or about 150 g/m$^2$. For example, the sizing layers 119 and/or 219 can have a basis weight of about 1 g/m$^2$ to about 150 g/m$^2$, about 5 g/m$^2$ to about 100 g/m$^2$, about 10 g/m$^2$ to about 100 g/m$^2$, about 20 g/m$^2$ to about 100 g/m$^2$, about 30 g/m$^2$ to about 100 g/m$^2$, about 10 g/m$^2$ to about 90 g/m$^2$, about 10 g/m$^2$ to about 80 g/m$^2$, about 20 g/m$^2$ to about 80 g/m$^2$, about 30 g/m$^2$ to about 80 g/m$^2$, or about 40 g/m$^2$ to about 60 g/m$^2$.

The sizing layers 119 and/or 219 can have an oil and grease resistance (OGR) property for providing a barrier to one or more oils, greases, fats, or other organic-based compounds or materials. Illustrative organic-based compounds or materials can include, but are not limited to, oils, greases, fats, organic solvents, motor oil, hydraulic fluid, brake fluid, automatic transmission fluid, or any mixture thereof. In some examples, one or more of the layers 117, 217, and/or 230 and/or the energy absorbing layers 125 and/or 225 can have the OGR properties as the sizing layers 119 and/or 219.

In one aspect, the OGR property can be measured or otherwise determined by using a test kit referred to as the "3M Test Kit" (TAPPI T-559 standard test for Grease Resistance for Paper and Paperboard, established by the Technical Association of the Pulp and Paper Industry, Norcross, Ga., USA; and commercially available from 3M Company, St. Paul, Minn., USA). The "3M Test Kit" includes 12 solutions composed of castor oil, toluene, and n-heptane having various concentrations. Each oil solution can be applied to a sample portion of the sizing layers 119 and/or 219. The highest numbered solution (the most aggressive) that remains on the surface of the sizing layers 119 and/or 219 without causing failure (e.g., soaking through the layer) is scored as integers from 0 to 12 (worst to best) based on the liquid wetting and penetrating and is reported as the OGR value. The test can be repeated multiple times and the average OGR value can be calculated for each sample.

The sizing layers 119 and/or 219 can independently have an average OGR value of about 6, about 6.2, about 6.4, about 6.6, about 6.8, about 7, about 7.2, about 7.4, about 7.6, about 7.8, about 8, about 8.2, about 8.4, about 8.6, about 8.8, about 9, about 9.2, about 9.4, about 9.6, about 9.8, about 10, about 10.1, about 10.2, about 10.3, about 10.4, about 10.5, about 10.6, about 10.7, about 10.8, about 10.9, about 11, about 11.1, about 11.2, about 11.3, about 11.4, about 11.5, about 11.6, about 11.7, about 11.8, about 11.9, about 12, as measured according to TAPPI T-559 standard test for Grease Resistance for Paper and Paperboard. In some examples, the sizing layers 119 and/or 219 can independently have an OGR value or an average OGR value of about 6 to about 12, about 8 to about 12, about 10 to about 12, about 8 to about 11, or about 6 to about 10, as measured according to TAPPI T-559 standard test for Grease Resistance for Paper and Paperboard.

The OGR property of the protection barriers 100 and 200 can be measured or otherwise determined by using a boat float test, according to the Georgia-Pacific Flotation Paper Saturation Test STP-415. In the boat float test, the protection barriers 100 and 200 are folded into a boat-shaped sample, then floated in a wetting solution for a given time period. An OGR flotation value can be determine by the amount of time that the boat-shaped samples have successfully remained floating in the wetting solution (as opposed to sinking in the wetting solution). The wetting solution can be or include one or more organic based compounds, oils, greases, organic solvents, motor oil, hydraulic fluid, brake fluid, automatic transmission fluid, standardized hydrocarbon solutions, such as any of the solutions from the 3M Test Kit (e.g., solutions can include castor oil, toluene, or n-heptane), or any mixture thereof. As used herein, unless otherwise noted, the OGR flotation values can be measured according to the Georgia-Pacific Flotation Paper Saturation Test STP-415 with automotive brake fluid at a temperature of about 100° C.

The protection barriers 100 and/or 200 can be folded into a boat-shaped sample, such as by folding about 2.54 cm of each side of a square sample having side lengths of about 15.24 cm for each protection barrier 100, 200. Each protection barrier 100, 200 can be folded so that the upper surfaces 102, 202 are facing inward and upward so to be within the boat-shaped sample while the lower surfaces 104, 204 are facing downward and outward so to be outside of the boat-shaped sample. Each of the corners of the boat-shaped sample can be stapled. The wetting solution (e.g., hydraulic fluid or automotive brake fluid) contained within a vat can be heated and maintained at a temperature of about 100° C. The boat-shaped samples of the protection barriers 100, 200 can be placed into heated wetting solution such that the upper surfaces 102, 202 are disposed facing away from the wetting solution and the lower surfaces 104, 204 are disposed facing into the heated wetting solution. The time that the boat-shaped samples of the protection barriers 100, 200 can be monitored and recorded for any time period, such as, for example, about 30 seconds or about 3 months.

In some examples, the protection barriers 100 and/or 200 can have an OGR flotation value of about 0.1 hr, about 0.5 hr, about 1 hr, about 2 hr, about 3 hr, about 4 hr, about 5 hr, about 6 hr, about 7 hr, about 8 hr, about 9 hr, about 10 hr, about 11 hr, about 12 hr, about 13 hr, about 14 hr, about 15 hr, about 16 hr, about 17 hr, about 18 hr, about 19 hr, about 20 hr, about 21 hr, about 22 hr, about 23 hr, about 24 hr, about 25 hr, about 26 hr, about 27 hr, about 28 hr, about 29 hr, about 30 hr, about 50 hr, about 100 hr, or longer, as measured according to the Georgia-Pacific Flotation Paper Saturation Test STP-415. In some specific examples, the protection barriers 100 and/or 200 can have an OGR flotation value of about 4 hr to about 24 hr. In other specific examples, the protection barriers 100 and/or 200 can have an OGR flotation value of about 8 hr to about 24 hr. In other specific examples, the protection barriers 100 and/or 200 can have an OGR flotation value of greater than 24 hr or greater than 48 hr.

The OGR property of the protection barriers 100 and 200 can also be measured or otherwise determined by using a spill catch test. In the spill catch test, a sample of the protection barrier 100 or 200 is disposed onto a flooring surface, then a wetting fluid is added to the upper surface 102 or 202. After a given time period, the flooring surface is checked for the presence of the wetting fluid. An OGR spill-catch value can be determine by the maximum amount of time that lapsed from exposing the wetting fluid to the sample to the time the flooring surface is checked and remains free of the wetting fluid. The protection barrier sample can be a square sample having side lengths of about 15.24 cm for each protection barrier 100, 200. The wetting fluid can be in an amount of about 10 mL and can be or include one or more organic based fluids, such as oils, greases, organic solvents, motor oil, hydraulic fluid, brake fluid, automatic transmission fluid, standardized hydrocarbon solutions, such as any of the solutions from the 3M Test Kit, or any mixture thereof. The samples of the protection barriers 100, 200 can be monitored and recorded for any time period, such as, for example, from about 15 minutes to about 24 hours or about 7 days. As used herein, unless otherwise noted, the OGR spill-catch values are provided in reference to 10 mL of automatic transmission fluid at a temperature of about 23° C.

In some examples, the protection barriers 100 and/or 200 can have an OGR spill-catch value of about 0.1 hr, about 0.5 hr, or about 1 hr to about 1.5 hr, about 2 hr, about 3 hr, about 4 hr, about 5 hr, about 6 hr, about 7 hr, about 8 hr, about 9 hr, about 10 hr, about 11 hr, about 12 hr, about 13 hr, about 14 hr, about 15 hr, about 16 hr, about 17 hr, about 18 hr, about 19 hr, about 20 hr, about 21 hr, about 22 hr, about 23 hr, about 24 hr, about 25 hr, about 26 hr, about 27 hr, about 28 hr, about 29 hr, about 30 hr, about 50 hr, about 100 hr, or longer. In some specific examples, the protection barriers 100 and/or 200 can have an OGR spill-catch value of about 0.5 hr to about 24 hr. In other specific examples, the protection barriers 100 and/or 200 can have an OGR spill-catch value of about 1 hr to about 18 hr. In other specific examples, the protection barriers 100 and/or 200 can have an OGR spill-catch value of greater than 24 hr or greater than 48 hr.

The energy absorbing layers 125 and/or 225 can be similar to the layers 117, 217, and/or 230. For example, the energy absorbing layers 125 and/or 225 can include or contain a plurality of lignocellulosic fibers, natural fibers, synthetic fibers, recycled fibers, or any mixture thereof. The energy absorbing layers 125 and/or 225 can include open cell foam, closed cell foam, or a combination or mixture of open cell foam and closed cell foam. In some specific examples, the energy absorbing layers 125 and/or 225 can contain virgin natural fibers, such as hardwood fibers, softwood fibers, or a mixture thereof The energy absorbing layers 125 and/or 225 can be affixed, adhered, attached, fastened, or otherwise secured to the corresponding base sheet 115 and/or 215. For example, one or more adhesives or binders can be used to secure the energy absorbing layer 125 and/or 225 to the corresponding base sheet 115 and/or 215. Illustrative adhesives that can be used to secure any two adjacent layers, i.e., any two of the layers 117, 217, and 230, the sizing layers 119 and 219, and the energy absorbing layers 125 and 225 can include, but are not limited to, starch-based adhesives, isocyanate resins, urea-formaldehyde resins, phenol-formaldehyde resins, melamine-formaldehyde resins, phenol-urea-formaldehyde resin resins, resorcinol-formaldehyde resins, phenol-resorcinol-formaldehyde resins, melamine-urea-formaldehyde resins, oxidative binders, or any mixture thereof. In at least one example, the adhesive, if present, can be or include a starch-based adhesive.

For an energy absorbing layer 125 and/or 225 that includes foam, such as open and/or closed cell foam, the foam can have any desired shape or configuration. For example, the foam can be in the form of a continuous sheet or layer. In another example, the foam can be randomly or systematically disposed about the side of the corresponding base sheet 115, 215 in a non-continuous manner such that a plurality of islands or regions of the energy absorbing layer 125 and/or 225 are secured to the corresponding base sheet 115, 215. In another example, the foam can be disposed about the side of the corresponding base sheet 115, 215 in regular patterns such as a plurality of lines such that the foam forms a plurality of ridges along a length or width of the side of the corresponding base sheet 115, 215.

The energy absorbing layers 125 and/or 225 can have a thickness of about 0.005 mm, about 0.01 mm, about 0.02 mm, about 0.03 mm, about 0.04 mm, about 0.05 mm, about 0.1 mm, or about 0.15 mm to about 0.25 mm, about 0.5 mm, about 0.75 mm, about 1 mm, about 1.25 mm, about 1.5 mm, about 1.75 mm, about 2 mm, or greater. For example, the energy absorbing layers 125 and/or 225 can have a thickness of about 0.05 mm to about 2 mm, about 0.1 mm to about 2 mm, about 0.1 mm to about 1.5 mm, about 0.1 mm to about 1 mm, about 0.2 mm to about 0.9 mm, or about 0.3 mm to about 0.8 mm.

The energy absorbing layers 125 and/or 225 can be a corrugated layer that can include one or more pluralities of flutes. FIGS. 1 and 2 depict the energy absorbing layers 125 and 225 as corrugated or fluted layers without including face boards. However, in other examples, the energy absorbing layers 125 and 225 can be or include single face boards, single wall boards, or multi-wall boards, such as, for example, double wall boards or triple wall boards (not shown). Therefore, each of the energy absorbing layer 125 or 225 can independently include one or more corrugated or fluted layers and one or more wall boards or face boards.

For an energy absorbing layer 125 and/or 225 that includes one or more pluralities of flutes, the height of the flutes and/or the thickness of the energy absorbing layers 125 and/or 225 can include the sum of the vertical height from an equilibrium point to the highest point of a flute's crest and the vertical depth from the equilibrium point to the lowest point of a flute's trough. In some examples, an energy absorbing layer 125 and/or 225 that includes one or more pluralities of flutes, the height of the flutes (e.g., the thickness of the energy absorbing layer 125, 225) can be about 0.05 mm, about 0.1 mm, about 0.2 mm, about 0.3 mm, about 0.4 mm, or about 0.5 mm to about 0.55 mm, about 0.6 mm, about 0.65 mm, about 0.7 mm, about 0.75 mm, about 0.8 mm, about 0.85 mm, about 0.9 mm, about 0.95 mm, about 1 mm, about 1.05 mm, about 1.1 mm, about 1.15 mm, about 1.2 mm, about 1.25 mm, about 1.3 mm, about 1.35 mm, about 1.4 mm, about 1.45 mm, about 1.5 mm, about 1.55 mm, about 1.6 mm, about 1.65 mm, about 1.7 mm, about 1.75 mm, about 1.8 mm, about 1.85 mm, about 1.9 mm, about 1.95 mm, about 2 mm, about 2.05 mm, about 2.1 mm, about 2.15 mm, about 2.2 mm, about 2.25 mm, about 2.3 mm, about 2.35 mm, about 2.4 mm, about 2.45 mm, about 2.5 mm, about 2.55 mm, about 2.6 mm, about 2.65 mm, about 2.7 mm, about 2.75 mm, about 2.8 mm, about 2.85 mm, about 2.9 mm, about 2.95 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, or greater. For example, the height of the flutes (e.g., the thickness of the energy absorbing layer 125, 225) can be about 0.5 mm to about 7 mm, about 0.5 mm to about 6 mm, about 0.5 mm to about 5 mm, about 0.5 mm to about 4 mm, about 0.5 mm to about 3 mm, about 0.5 mm to about 2 mm, about 0.5 mm to about 1.5 mm, about 0.6 mm to about 1.5 mm, about 0.7 mm to about 1.4 mm, about 0.8 mm to about 1.4 mm, about 0.9 mm to about 1.4 mm, about 0.9 mm to about 1.3 mm, about 1 mm to about 1.3 mm, about 1 mm to about 1.2 mm, about 1.1 mm to about 1.2 mm, about 1.12 mm to about 1.18 mm, about 1.12 mm to about 1.16 mm, about 1.12 mm to about 1.14 mm, about 1.14 mm to about 1.18 mm, or about 1.16 mm to about 1.18 mm. In some examples, the height of the flutes (e.g., the thickness of the energy absorbing layer 125, 225) can be about 0.5 mm to about 7 mm, about 0.5 mm to about 6 mm, about 0.5 mm to about 5 mm, about 0.5 mm to about 4 mm, about 0.5 mm to about 3 mm, about 0.5 mm to about 2 mm, about 0.1 mm to about 2 mm, about 0.1 mm to about 1.5 mm, about 0.1 mm to about 1 mm, about 0.2 mm to about 0.9 mm, or about 0.3 mm to about 0.8 mm. In other examples, an energy absorbing layer 125 and/or 225 that includes one or more pluralities of flutes can include size A flutes, size B flutes, size C flutes, size E flutes, size F flutes, or any combination thereof The energy absorbing layers 125 and/or 225 can be a configured to provide a contact surface between the energy absorbing layers 125 and/or 225 and a surface to be protected by the protection barriers 100 and/or 200 having a reduced contact relative to a surface area of a side of the protection barriers 100 and/or 200 that opposes the energy absorbing layers 125 and/or 225. For example, the contact area between the energy absorbing layers 125 and/or 225 can be about 5% less, about 10% less, about 15% less, about 20% less, about 25% less, about 30% less, about 35% less, about 40% less, about 45% less about 50% less about 55% less, about 60% less, about 65% less, about 70% less, about 75% less, about 80% less, about 85% less, about 90% less, or about 95% less than a surface area of the protection barrier 100 and/or 200 that opposes the energy absorbing layer 125 and/or 225. For example, an energy absorbing layer 125 and/or 225 that includes a corrugated layer having a plurality of flutes or a plurality of ridges formed by securing open and/or closed cell foam along a side of the protection barrier 100 and/or 200 can have a reduced contact area of about 25% to about 85%, about 50% to about 75%, about 65% to about 80%, or about 35% to about 75% less than a surface area of the of the protection barrier 100 and/or 200 that opposes the energy absorbing layer 125 and/or 225. Reducing the contact area between the energy absorbing layer 125 and/or 225 and a surface to be protected can reduce the tendency or likelihood that the protection barrier 100 and/or 200 may cause scratches or other surface disruptions in a surface to be protected when located thereon.

The energy absorbing layers 125 and/or 225 can have a basis weight of about 50 g/m$^2$, about 100 g/m$^2$, about 150 g/m$^2$, about 200 g/m$^2$, about 250 g/m$^2$, about 300 g/m$^2$, about 350 g/m$^2$, about 400 g/m$^2$, about 450 g/m$^2$, or about 500 g/m$^2$ to about 550 g/m$^2$, about 600 g/m$^2$, about 700 g/m$^2$, about 800 g/m$^2$, about 900 g/m$^2$, or about 1,000 g/m$^2$. For example, the energy absorbing layers 125 and/or 225 can have a basis weight of about 50 g/m$^2$ to about 1,000 g/m$^2$, about 50 g/m$^2$ to about 400 g/m$^2$, about 100 g/m$^2$ to about 800 g/m$^2$, about 100 g/m$^2$ to about 200 g/m$^2$, about 110 g/m$^2$ to about 160 g/m$^2$, about 200 g/m$^2$ to about 800 g/m$^2$, about 300 g/m$^2$ to about 600 g/m$^2$, about 300 g/m$^2$ to about 800 g/m$^2$, about 400 g/m$^2$ to about 700 g/m$^2$, or about 500 g/m$^2$ to about 600 g/m$^2$.

The energy absorbing layers 125 and/or 225 can include one or more pluralities of flutes, each plurality of flutes can include about 50 flutes, about 75 flutes, about 100 flutes, about 150 flutes, about 200 flutes, or about 250 flutes to about 500 flutes, about 600 flutes, about 700 flutes, about 800 flutes, about 900 flutes, or about 1,000 flutes per linear meter. In some examples, each plurality of flutes in the energy absorbing layer 125 or 225 can include about 50 flutes/linear meter to about 1,000 flutes/linear meter, about 100 flutes/linear meter to about 800 flutes/linear meter, about 150 flutes/linear meter to about 700 flutes/linear meter, about 150 flutes/linear meter to about 600 flutes/linear meter, about 200 flutes/linear meter to about 600 flutes/linear meter, about 200 flutes/linear meter to about 500 flutes/linear meter, about 200 flutes/linear meter to about 400 flutes/linear meter, about 250 flutes/linear meter to about 350 flutes/linear meter, or about 280 flutes/linear meter to about 320 flutes/linear meter.

The energy absorbing layers 125 and/or 225 can have a water vapor transmission rate of about 5, about 10, or about 15 g/645.2 cm$^2$/24 hr to about 20, about 25, about 30, about 35, about 40, about 45, about 50 g/645.2 cm$^2$/24 hr, or greater, as measured according to ASTM E96M-14, Procedure A. For example, the energy absorbing layers 125 and/or 225 can have a water vapor transmission rate of about 5 to about 50, about 10 to about 40, about 15 to about 35, or about 20 to about 30 g/645.2 cm$^2$/24 hr, as measured according to ASTM E96M-14, Procedure A.

Any one or more of the layers 117, 217, and/or 230, the sizing layers 119 and/or 219, and/or the energy absorbing layers 125 and/or 225 can also include one or more wet strengthening agents. Illustrative wet strengthening agents can include, but are not limited to, one or more PAE resins, SMA resins, SMI resins, GPAm resins, or any mixture thereof. Any one or more of the layers 117, 217, and/or 230, the sizing layers 119 and/or 219, and/or the energy absorbing layers 125 and/or 225 can also include one or more fire retardant agents. Illustrative fire retardant agents can include, but are not limited to, styrene butadiene, vinyl acetate ethylene (VAE) copolymer, latex, aluminum trihydrate (e.g., aluminum hydroxide or alumina trihydrate), clay, calcium carbonate, or any mixture thereof.

The fire retardant agent or layer, if present, can be applied to the protection barrier 100 and/or 200 as a coating, a film, or other separate or independent layer. For example, the fire retardant agent or layer, if present in the protection barrier 100 and/or 200, can be applied as a liquid emulsion, suspension, dispersion, or other flowable mixture via spraying, dip coating, misting, brushing, or any other suitable method to the protection barrier 100 and/or 200. In some examples, the fire retardant agent or layer can be applied to the upper surfaces 102, 202 and/or the lower surfaces 104, 204 of the protection barriers 100, 200. In other examples, the fire retardant agent or layer can be applied to or contained within one or more of the layers 117, 217, and/or 230, the sizing layers 119 and/or 219, and/or the energy absorbing layers 125 and/or 225. Illustrative fire retardant agents can include, but are not limited to, styrene butadiene, VAE copolymer, latex, aluminum trihydrate (e.g., aluminum hydroxide or alumina trihydrate), clay, calcium carbonate, or any mixture thereof The thickness of the protection barrier 100 and/or 200 can be measured to include the thickness of the base sheets 115 and/or 215 and the thickness of the energy absorbing layers 125 and/or 225. The protection barrier 100 and/or 200 can have a thickness of about 0.2 mm, about 0.5 mm, about 1 mm, about 2 mm, or about 3 mm to about 5 mm, about 6 mm, about 7 mm, about 8 mm, about 9 mm, or about 10 mm. In some examples, the protection barrier 100 and/or 200 can have a thickness of about 0.5 mm, about 0.6 mm, about 0.7 mm, about 0.8 mm, about 0.9 mm, or about 1 mm to about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.5 mm, or about 3 mm. For example, the protection barrier 100 and/or 200 can have a thickness of about 0.1 mm to about 10 mm, about 0.2 mm to about 5 mm, about 0.25 mm to about 2.5 mm, about 0.3 mm to about 2 mm, about 0.35 mm to about 1.5 mm, about 0.5 mm to about 10 mm, about 0.5 mm to about 8 mm, about 0.5 mm to about 5 mm, about 1 mm to about 10 mm, about 1 mm to about 8 mm, about 1 mm to about 5 mm, about 2 mm to about 10 mm, about 2 mm to about 8 mm, or about 2 mm to about 5 mm.

The protection barrier 100 and/or 200 can have a width and/or a length of about 0.1 m, about 0.2 m, about 0.25 m, about 0.5 m, or about 1 m to about 2 m, about 3 m, about 4 m, or about 5 m. For example, the protection barrier 100 and/or 200 can have a width and/or a length of about 0.2 m to about 5 m, about 0.2 m to about 4 m, about 0.2 m to about 3 m, about 0.2 m to about 2 m, about 0.2 m to about 1 m, about 0.25 m to about 2 m, about 0.25 m to about 4 m, about 0.25 m to about 6 m, about 0.4 m to about 3 m, about 0.5 m to about 5 m, about 0.5 m to about 4 m, about 0.5 m to about 3 m, about 0.5 m to about 2 m, or about 0.5 m to about 1 m.

The protection barrier 100 and/or 200 can have a basis weight of about 50 g/m$^2$, about 100 g/m$^2$, about 150 g/m$^2$, about 200 g/m$^2$, about 250 g/m$^2$, about 300 g/m$^2$, about 350 g/m$^2$, about 400 g/m$^2$, about 450 g/m$^2$, or about 500 g/m$^2$ to about 550 g/m$^2$, about 600 g/m$^2$, about 700 g/m$^2$, about 800 g/m$^2$, about 900 g/m$^2$, or about 1,000 g/m$^2$. For example, the protection barrier 100 and/or 200 can have a basis weight of about 50 g/m$^2$ to about 1,000 g/m$^2$, about 100 g/m$^2$ to about 800 g/m$^2$, about 200 g/m$^2$ to about 800 g/m$^2$, about 300 g/m$^2$ to about 600 g/m$^2$, about 300 g/m$^2$ to about 800 g/m$^2$, about 400 g/m$^2$ to about 700 g/m$^2$, or about 500 g/m$^2$ to about 600 g/m$^2$.

The protection barrier 100 and/or 200 can have a water vapor transmission rate of about 5, about 10, or about 15 g/645.2 cm$^2$/24 hr to about 20, about 25, about 30, about 35, about 40, about 45, about 50 g/645.2 cm$^2$/24 hr, or greater, as measured according to ASTM E96M-14, Procedure A. In some examples, the protection barrier 100 and/or 200 can have a water vapor transmission rate of about 5 to about 150, about 5 to about 100, about 5 to about 50, about 10 to about 40, about 15 to about 35, or about 20 to about 30 g/645.2 cm$^2$/24 hr, as measured according to ASTM E96M-14, Procedure A.

The protection barrier 100, 200 can have a vapor permeability of about 5, about 10, about 15, or about 20 g/645.2 cm$^2$/24 hr to about 25, about 30, about 35, about 40, about 45, about 50, about 55, about 60, about 65, about 70, about 75, about 80, about 85, about 90, about 95, about 100, about 105, about 110, about 115, about 120, about 125, about 130, about 135, about 140, about 145, about 150 g/645.2 cm$^2$/24 hr, or greater, as measured according to ASTM E96M-14, Procedures A and B. In some examples, the protection barrier 100, 200 can have a vapor permeability of about 5 to about 150, about 10 to about 50, about 15 to about 40, or about 20 to about 30 g/645.2 cm$^2$/24 hr, as measured according to ASTM E96M-14, Procedures A and B.

Figure 3:
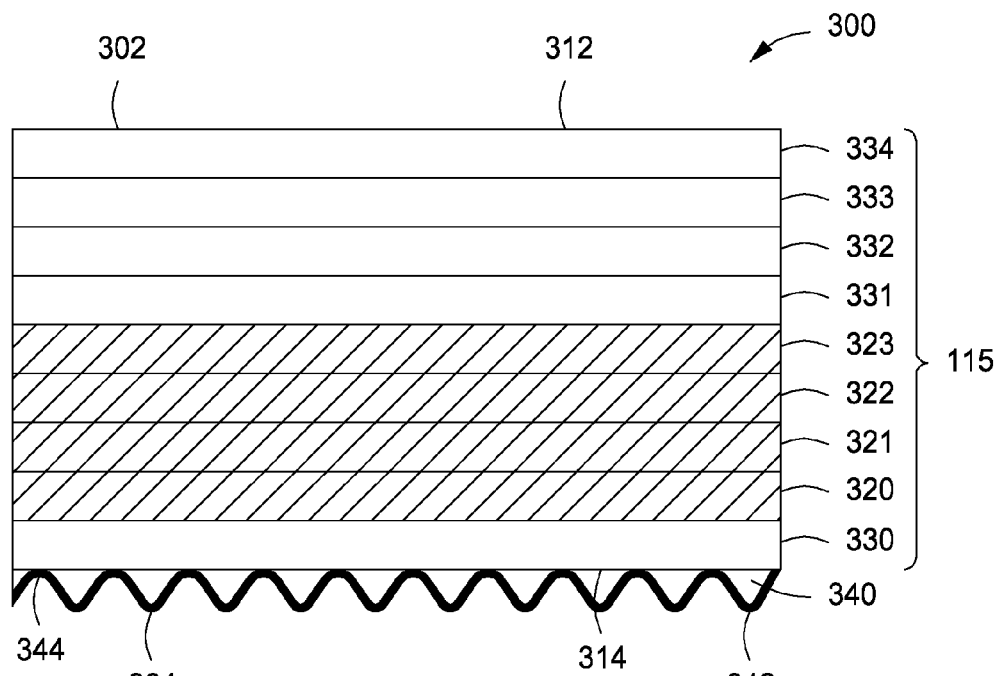
FIG. 3 depicts a cross-sectional view of an illustrative protection barrier that includes a sizing layer, at least five paperboard layers, and an energy absorbing layer, according to one or more embodiments described.

FIG. 3 depicts a cross-sectional view of another illustrative protection barrier 300 that can include one or more base sheets 310 and one or more energy absorbing layers 340. The energy absorbing layer 340 can be affixed, adhered, attached, fastened, or otherwise secured to the base sheet 310. The base sheet 310 can include one or more layers (e.g., paperboard layers) (five are shown, 330, 331, 332, 333, and 334) and one or more sizing layers (four are shown, 320, 321, 322, and 323). The sizing layers 320-323 can be disposed between at least one or more layers 330-334 and the energy absorbing layer 340. For example, as depicted in FIG. 3, the sizing layers 320-323 can be disposed between the layers 331-334 and the energy absorbing layer 340. Also, the protection barrier 300 can also include at least one or more layers 330-334 disposed between the one or more sizing layers 320-323 and the energy absorbing layer 340. For example, the layer 330 can be disposed between the one or more sizing layers 320-323 and the energy absorbing layer 340.

The base sheet 310 can include one or more sizing layers 320-323 disposed between two or more layers 330-334, such that the layer 334 of the two or more layers 330-334 can form a first or "upper" surface 302 of the protection barrier 300. The first surface 302 can also be a first or "upper" surface 312 of the base sheet 310. The energy absorbing layer 340 can be secured to a second or "lower" surface 314 of the base sheet 310 and can form a second or "lower" surface 304 of the protection barrier 300. The energy absorbing layer 340 can have a plurality of flutes 342. In one example, the energy absorbing layer 340 can be secured to the layer 330 of the two or more layers 330-334. The one or more sizing layers 320-323 can be disposed between at least the layer 330 and at least the layer 334. In some examples, any one or more of the layers 331-333 can independently be disposed between the one or more sizing layers 320-323 and the layer 334 (as depicted in FIG. 3) or between the one or more sizing layers 320-323 and the layer 330 (now shown).

The base sheet 310 can have a thickness of about 0.001 mm, about 0.005 mm, about 0.01 mm, about 0.02 mm, about 0.03 mm, about 0.04 mm, about 0.05 mm, about 0.1 mm, or about 0.15 mm to about 0.25 mm, about 0.5 mm, about 0.75 mm, about 1 mm, about 1.25 mm, about 1.5 mm, about 1.75 mm, about 2 mm, or greater. For example, the base sheet 310 can have a thickness of about 0.05 mm to about 2 mm, about 0.1 mm to about 2 mm, about 0.2 mm to about 2 mm, about 0.05 mm to about 1 mm, about 0.1 mm to about 0.25 mm, about 0.1 mm to about 0.25 mm, about 0.1 mm to about 1 mm, about 0.2 mm to about 1 mm, or about 0.5 mm to about 1 mm.

The base sheet 310 can have a basis weight of about 50 g/m$^2$, about 100 g/m$^2$, about 150 g/m$^2$, about 200 g/m$^2$, about 250 g/m$^2$, about 300 g/m$^2$, about 350 g/m$^2$, about 400 g/m$^2$, about 450 g/m$^2$, or about 500 g/m$^2$ to about 550 g/m$^2$, about 600 g/m$^2$, about 700 g/m$^2$, about 800 g/m$^2$, about 900 g/m$^2$, or about 1,000 g/m$^2$. For example, the base sheet 310 can have a basis weight of about 50 g/m$^2$ to about 1,000 g/m$^2$, about 100 g/m$^2$ to about 800 g/m$^2$, about 200 g/m$^2$ to about 800 g/m$^2$, about 300 g/m$^2$ to about 600 g/m$^2$, about 300 g/m$^2$ to about 800 g/m$^2$, about 400 g/m$^2$ to about 700 g/m$^2$, or about 500 g/m$^2$ to about 600 g/m$^2$.

In one example, as shown in FIG. 3, the base sheet 310 can have a plurality of the sizing layers 320-323, such as four sizing layers 320-323 and a plurality of the layers 330-334, such as six layers 330-334. In other examples, not shown, the base sheet 310 can have a single layer, two layers, three layers, or up to about ten or more layers of the sizing layers, such as sizing layers 320-323 and independently have one layer to about ten or more layers of the paperboard layers, such as the layers 330-334. Therefore, the sizing layers 320-323 can be secured, attached, or otherwise disposed, independently or together, between the layers 330-334. In some examples, the base sheet 310 can have two paperboard layers to about ten paperboard layers, such as the layers 330-334, and also have one sizing layer to about five sizing layers, such as the sizing layers 320-323. In other examples, the base sheet 310 can have four paperboard layers to about eight paperboard layers, such as the layers 330-334, and can also have two sizing layers to about four sizing layers, such as the sizing layers 320-323. In some examples, multiple sizing layers can be consecutively disposed on one another to form the sizing layers 320-323. In other examples, multiple paperboard layers can be consecutively disposed on one another to form the layers 330-334.

The base sheet 310 of the protection barrier 300 can include one or more wet strengthening agents. In some examples, the base sheet 310, including, but not limited to one or more layers 330-334 and/or one or more sizing layers 320-323, can contain one or more wet strengthening agents. The wet strengthening agent can be a resin, and can include PAE resins, SMA resins, SMI resins, GPAm resins, or any mixture thereof. The base sheet 310 can include one or more fire retardant agents. In some examples, the fire retardant agent or layer can be applied to the upper surface 302 and/or the lower surface 304 of the protection barrier 300. In other examples, the base sheet 310 can have one or more layers 330-334 which further contain one or more fire retardant agents or one or more sizing layers 320-323 which further contain one or more fire retardant agents. In other examples, the fire retardant agent or layer can be applied to or contained within the energy absorbing layer 340. Illustrative fire retardant agents can include, but are not limited to, styrene butadiene, VAE copolymer, latex, aluminum trihydrate (e.g., aluminum hydroxide or alumina trihydrate), clay, calcium carbonate, or any mixture thereof.

The layers 330-334 of the protection barrier 300 can contain lignocellulosic fibers, natural fibers, synthetic fibers, recycled fibers, or any mixture thereof. For example, the layers 330-334 can include gypsum wallboard facing paper, cardboard, paperboard, kraft paper, manila paper, newsliner paper, nylon, polyester, polypropylene, polyethylene, rayon, or any mixture thereof.

Each of the layers 330-334 can have a water absorbency of about 0.01 g/g (g of water per 1 g of the paperboard layer at about 23° C.), about 0.03 g/g, about 0.05 g/g, about 0.07 g/g, about 0.1 g/g, about 0.15 g/g, about 0.2 g/g, about 0.3 g/g, about 0.5 g/g, about 0.7 g/g, about 1 g/g, about 1.3 g/g, or about 1.5 g/g to about 2 g/g, about 2.5 g/g, about 3 g/g, about 3.5 g/g, about 4 g/g, about 4.5 g/g, about 5 g/g, about 6 g/g, about 7 g/g, about 8 g/g, about 9 g/g, or about 10 g/g. Each of the layers 330-334 can have a water absorbency of at least 0.05 g/g, at least 0.07 g/g, at least 0.1 g/g, at least 0.13 g/g, at least 0.15 g/g, at least 0.2 g/g, at least 0.3 g/g, at least 0.4 g/g, at least 0.5 g/g, at least 0.6 g/g, at least 0.7 g/g, at least 0.8 g/g, at least 0.9 g/g, at least 1 g/g, or at least 1.1 g/g and up to about 1.5 g/g, about 2 g/g, about 2.5 g/g, about 3 g/g, about 4 g/g, about 5 g/g, about 6 g/g, or about 7 g/g. For example, each of the layers 330-334 can have a water absorbency of about 0.01 g/g to about 5 g/g, about 0.1 g/g to about 7 g/g, about 0.1 g/g to about 6 g/g, about 0.1 g/g to about 5 g/g, about 0.1 g/g to about 4 g/g, about 0.1 g/g to about 3 g/g, about 1 g/g to about 7 g/g, about 1 g/g to about 6 g/g, about 1 g/g to about 5 g/g, about 1 g/g to about 4 g/g, or about 1 g/g to about 3 g/g. The water absorbency can be measured according to the Cobb test for a time of 180 seconds and a temperature of about 23° C.

Each of the layers 330-334 can have a void volume ratio of about 1, about 2, about 3, or about 4 to about 7, about 8, about 9, or about 10. For example, each of the layers 330-334 can have a void volume ratio of at least 1, at least 1.5, at least 2, at least 2.5, at least 3, at least 3.5, or at least 4 and up to about 7, about 8, about 9, or about 10.

Each of the layers 330-334 can have a thickness of about 0.001 mm, about 0.005 mm, about 0.01 mm, about 0.02 mm, about 0.03 mm, about 0.04 mm, about 0.05 mm, about 0.1 mm, or about 0.15 mm to about 0.25 mm, about 0.5 mm, about 0.75 mm, about 1 mm, about 1.25 mm, about 1.5 mm, about 1.75 mm, about 2 mm, or greater. For example, each of the layers 330-334 can have a thickness of about 0.05 mm to about 2 mm, about 0.1 mm to about 2 mm, about 0.2 mm to about 2 mm, about 0.05 mm to about 1 mm, about 0.1 mm to about 0.25 mm, about 0.1 mm to about 0.25 mm, about 0.1 mm to about 1 mm, about 0.2 mm to about 1 mm, or about 0.5 mm to about 1 mm.

Each of the layers 330-334 can have a basis weight of about 1 g/m$^2$, about 5 g/m$^2$, about 10 g/m$^2$, about 15 g/m$^2$, about 20 g/m$^2$, about 25 g/m$^2$, or about 30 g/m$^2$, to about 60 g/m$^2$, about 70 g/m$^2$, about 80 g/m$^2$, about 90 g/m$^2$, about 100 g/m$^2$, or about 150 g/m$^2$. For example, each of the layers 330-334 can have a basis weight of about 1 g/m$^2$ to about 150 g/m$^2$, about 5 g/m$^2$ to about 100 g/m$^2$, about 10 g/m$^2$ to about 100 g/m$^2$, about 20 g/m$^2$ to about 100 g/m$^2$, about 30 g/m$^2$ to about 100 g/m$^2$, about 10 g/m$^2$ to about 90 g/m$^2$, about 10 g/m$^2$ to about 80 g/m$^2$, about 20 g/m$^2$ to about 80 g/m$^2$, about 30 g/m$^2$ to about 80 g/m$^2$, or about 40 g/m$^2$ to about 60 g/m$^2$.

The first layer 334 can form the upper or first surface 302 of the protection barrier 300 and the energy absorbing layer 340 can form the lower or second surface 304 of the protection barrier 300. In some examples, the "first" layer 334 can contain one or more wet strengthening agents. In other examples, the "first two" layers 333, 334, forming or adjacent the upper or first surface 302 of the protection barrier 300, can contain one or more wet strengthening agents. In other examples, the "first three" layers 332-334, forming or adjacent the upper or first surface 302 of the protection barrier 300, can contain one or more wet strengthening agents. Exemplary wet strengthening agents can include PAE resins, SMA resins, SMI resins, or any mixture thereof.

The sizing layers 320-323 of the protection barrier 300 can contain one or more types of fibers and one or more sizing agents. Exemplary fibers can include lignocellulosic fibers, natural fibers, synthetic fibers, recycled fibers, or any mixture thereof. For example, the sizing layers 320-323 can include gypsum wallboard facing paper, cardboard, paperboard, kraft paper, manila paper, newsliner paper, nylon, polyester, polypropylene, polyethylene, rayon, or any mixture thereof. Each of the sizing layers 320-323 can contain or include one or more sizing agents that includes clay-based materials, rosins or rosin-based compounds, latex or latex-based materials, starches or modified starches, gelatin, waxes, acrylic copolymers, AKD, ASA, PAE, SMA, SMI, SAE, SAA, EAA, PLR, a rosin and ASA composition, a gelatin and PUR composition, or any mixture thereof.

Each of the sizing layers 320-323 can have a thickness of about 0.001 mm, about 0.005 mm, about 0.01 mm, about 0.02 mm, about 0.03 mm, about 0.04 mm, about 0.05 mm, about 0.1 mm, or about 0.15 mm to about 0.25 mm, about 0.5 mm, about 0.75 mm, about 1 mm, about 1.25 mm, about 1.5 mm, about 1.75 mm, about 2 mm, or greater. For example, each of the sizing layers 320-323 can have a thickness of about 0.05 mm to about 2 mm, about 0.1 mm to about 2 mm, about 0.2 mm to about 2 mm, about 0.05 mm to about 1 mm, about 0.1 mm to about 0.25 mm, about 0.1 mm to about 0.25 mm, about 0.1 mm to about 1 mm, about 0.2 mm to about 1 mm, or about 0.5 mm to about 1 mm.

Each of the sizing layers 320-323 can have a basis weight of about 1 g/m$^2$, about 5 g/m$^2$, about 10 g/m$^2$, about 15 g/m$^2$, about 20 g/m$^2$, about 25 g/m$^2$, or about 30 g/m$^2$, to about 60 g/m$^2$, about 70 g/m$^2$, about 80 g/m$^2$, about 90 g/m$^2$, about 100 g/m$^2$, or about 150 g/m$^2$. For example, each of the sizing layers 320-323 can have a basis weight of about 1 g/m$^2$ to about 150 g/m$^2$, about 5 g/m$^2$ to about 100 g/m$^2$, about 10 g/m$^2$ to about 100 g/m$^2$, about 20 g/m$^2$ to about 100 g/m$^2$, about 30 g/m$^2$ to about 100 g/m$^2$, about 10 g/m$^2$ to about 90 g/m$^2$, about 10 g/m$^2$ to about 80 g/m$^2$, about 20 g/m$^2$ to about 80 g/m$^2$, about 30 g/m$^2$ to about 80 g/m$^2$, or about 40 g/m$^2$ to about 60 g/m$^2$.

The sizing layers 320-323 can have the OGR property for providing a barrier to one or more oils, greases, fats, or other organic-based compounds or materials. Illustrative organic-based compounds or materials can include, but are not limited to, oils, greases, fats, organic solvents, motor oil, hydraulic fluid, brake fluid, automatic transmission fluid, or any mixture thereof. In some examples, one or more of the layers 330-334 can have the OGR properties as sizing layers 320-323, and/or the energy absorbing layer 340.

In one aspect, the OGR property can be measured or otherwise determined by using a test kit referred to as the "3M Test Kit" (TAPPI T-559 standard test for Grease Resistance for Paper and Paperboard, established by the Technical Association of the Pulp and Paper Industry, Norcross, Ga., USA; and commercially available from 3M Company, St. Paul, Minn., USA). The "3M Test Kit" includes 12 solutions composed of castor oil, toluene, and n-heptane having various concentrations. Each oil solution can be applied to a sample portion of the sizing layers 320-323. The highest numbered solution (the most aggressive) that remains on the surface of the sizing layers 320-323 without causing failure (e.g., soaking through the layer) is scored as integers from 0 to 12 (worst to best) based on the liquid wetting and penetrating and is reported as the OGR value. The test can be repeated multiple times and the average OGR value can be calculated for each sample.

The sizing layers 320-323 can independently have an average OGR value of about 6, about 6.2, about 6.4, about 6.6, about 6.8, about 7, about 7.2, about 7.4, about 7.6, about 7.8, about 8, about 8.2, about 8.4, about 8.6, about 8.8, about 9, about 9.2, about 9.4, about 9.6, about 9.8, about 10, about 10.1, about 10.2, about 10.3, about 10.4, about 10.5, about 10.6, about 10.7, about 10.8, about 10.9, about 11, about 11.1, about 11.2, about 11.3, about 11.4, about 11.5, about 11.6, about 11.7, about 11.8, about 11.9, about 12, as measured according to TAPPI T-559 standard test for Grease Resistance for Paper and Paperboard. In some examples, the sizing layers 320-323 can independently have an OGR value or an average OGR value of about 6 to about 12, about 8 to about 12, about 10 to about 12, about 8 to about 11, or about 6 to about 10, as measured according to TAPPI T-559 standard test for Grease Resistance for Paper and Paperboard.

The OGR property of the protection barrier 300 can be measured or otherwise determined by using a boat float test, according to the Georgia-Pacific Flotation Paper Saturation Test STP-415. In the boat float test, the protection barrier 300 is folded into a boat-shaped sample, then floated in a wetting solution for a given time period. An OGR flotation value can be determine by the amount of time that the boat-shaped sample has successfully remained floating in the wetting solution (as opposed to sinking in the wetting solution). The wetting solution can be or include one or more organic based compounds, oils, greases, organic solvents, standardized hydrocarbon solution, such as motor oil, hydraulic fluid, brake fluid, automatic transmission fluid, any of the solutions from the 3M Test Kit (e.g., solutions can include castor oil, toluene, or n-heptane), or any mixture thereof. As used herein, unless otherwise noted, the OGR flotation values can be measured according to the Georgia-Pacific Flotation Paper Saturation Test STP-415 with automotive brake fluid at a temperature of about 100° C.

In some examples, the protection barrier 300 can be folded into a boat-shaped sample, such as by folding about 2.54 cm of each side of a square sample having side lengths of about 15.24 cm for the protection barrier 300. The protection barrier 300 can be folded so that the upper surface 302 is facing inwards and upwards so to be within the boat-shaped sample while the lower surface 304 is facing downwards and outwards so to be outside of the boat-shaped sample. Each of the corners of the boat-shaped sample can be stapled. The wetting solution (e.g., hydraulic fluid or automotive brake fluid) contained within a vat can be heated and maintained at about 100° C. The boat-shaped sample of the protection barrier 300 can be placed into heated wetting solution such that the upper surface 302 is disposed facing away from the wetting solution and the lower surface 304 is disposed facing into the heated wetting solution. The time that the boat-shaped sample of the protection barrier 300 can be monitored and recorded for any time period, such as, for example, about 30 seconds or about 3 months.

In some examples, the protection barrier 300 can have an OGR flotation value of about 0.1 hr, about 0.5 hr, about 1 hr, about 2 hr, about 3 hr, about 4 hr, about 5 hr, about 6 hr, about 7 hr, about 8 hr, about 9 hr, about 10 hr, about 11 hr, about 12 hr, about 13 hr, about 14 hr, about 15 hr, about 16 hr, about 17 hr, about 18 hr, about 19 hr, about 20 hr, about 21 hr, about 22 hr, about 23 hr, about 24 hr, about 25 hr, about 26 hr, about 27 hr, about 28 hr, about 29 hr, about 30 hr, about 50 hr, about 100 hr, or longer, as measured according to the Georgia-Pacific Flotation Paper Saturation Test STP-415. In some specific examples, the protection barrier 300 can have an OGR flotation value of about 4 hr to about 24 hr. In other specific examples, the protection barrier 300 can have an OGR flotation value of about 8 hr to about 24 hr. In other specific examples, the protection barrier 300 can have an OGR flotation value of greater than 24 hr or greater than 48 hr.

The OGR property of the protection barrier 300 can also be measured or otherwise determined by using a spill catch test. In the spill catch test, a sample of the protection barrier 300 is disposed onto a flooring surface, then a wetting fluid is added to the upper surface 302. After a given time period, the flooring surface is checked for the presence of the wetting fluid. An OGR spill-catch value can be determine by the maximum amount of time that lapsed from exposing the wetting fluid to the sample to the time the flooring surface is checked and remains free of the wetting fluid. The protection barrier sample can be a square sample having side lengths of about 15.24 cm for the protection barrier 300. The wetting fluid can be or include one or more organic based fluids in an amount of about 10 mL, such as oils, greases, organic solvents, motor oil, hydraulic fluid, brake fluid, automatic transmission fluid, standardized hydrocarbon solutions, such as any of the solutions from the 3M Test Kit, or any mixture thereof. The samples of the protection barrier 300 can be monitored and recorded for any time period, such as, for example, from about 15 minutes to about 24 hours or about 7 days. As used herein, unless otherwise noted, the OGR spill-catch values are provided in reference to 10 mL of automatic transmission fluid at a temperature of about 23° C.

In some examples, the protection barrier 300 can have an OGR spill-catch value of about 0.1 hr, about 0.5 hr, or about 1 hr to about 1.5 hr, about 2 hr, about 3 hr, about 4 hr, about 5 hr, about 6 hr, about 7 hr, about 8 hr, about 9 hr, about 10 hr, about 11 hr, about 12 hr, about 13 hr, about 14 hr, about 15 hr, about 16 hr, about 17 hr, about 18 hr, about 19 hr, about 20 hr, about 21 hr, about 22 hr, about 23 hr, about 24 hr, about 25 hr, about 26 hr, about 27 hr, about 28 hr, about 29 hr, about 30 hr, about 50 hr, about 100 hr, or longer. In some specific examples, the protection barrier 300 can have an OGR spill-catch value of about 0.5 hr to about 24 hr. In other specific examples, the protection barrier 300 can have an OGR spill-catch value of about 1 hr to about 18 hr. In other specific examples, the protection barrier 300 can have an OGR spill-catch value of greater than 24 hr or greater than 48 hr.

Each of the sizing layers 320-323 can have a water vapor transmission rate of about 5, about 10, or about 15 g/645.2 cm$^2$/24 hr to about 20, about 25, about 30, about 35, about 40, about 45, about 50 g/645.2 cm$^2$/24 hr, or greater, as measured according to ASTM E96M-14, Procedure A. In some examples, the sizing layers 320-323 can independently have a water vapor transmission rate of about 5 to about 50, about 10 to about 40, about 15 to about 35, or about 20 to about 30 g/645.2 cm$^2$/24 hr, as measured according to ASTM E96M-14, Procedure A.

Each of the sizing layers 320-323 can have a dry rigidity of about 175, about 185, about 195, about 205, or about 215 grams per 6.35 mm of deflection to about 220, about 230, about 240, about 250, about 260, about 262, about 265, or about 270 grams per 6.35 mm of deflection. For example, each of the sizing layers 320-323 can have a dry rigidity of about 175 to about 270, about 175 to about 262, about 185 to about 270, or about 185 to about 265 grams per 6.35 mm of deflection.

The energy absorbing layer 340 of the protection barrier 300 can contain lignocellulosic fibers, natural fibers, synthetic fibers, recycled fibers, or any mixture thereof. In many examples, the energy absorbing layer 340 can contain virgin natural fibers, such as hardwood fibers. In some examples, the energy absorbing layer 340 can have a Mohs hardness of about 2 or less, about 1.8 or less, about 1.6 or less, about 1.4 or less, about 1.2 or less, or about 1 or less. In other examples, the energy absorbing layer 340 can be a corrugated medium.

The energy absorbing layer 340 can have a basis weight of about 50 g/m$^2$, about 100 g/m$^2$, about 150 g/m$^2$, about 200 g/m$^2$, about 250 g/m$^2$, about 300 g/m$^2$, about 350 g/m$^2$, about 400 g/m$^2$, about 450 g/m$^2$, or about 500 g/m$^2$ to about 550 g/m$^2$, about 600 g/m$^2$, about 700 g/m$^2$, about 800 g/m$^2$, about 900 g/m$^2$, or about 1,000 g/m$^2$. For example, the energy absorbing layer 340 can have a basis weight of about 50 g/m$^2$ to about 1,000 g/m$^2$, about 50 g/m$^2$ to about 400 g/m$^2$, about 100 g/m$^2$ to about 800 g/m$^2$, about 100 g/m$^2$ to about 200 g/m$^2$, about 110 g/m$^2$ to about 160 g/m$^2$, about 200 g/m$^2$ to about 800 g/m$^2$, about 300 g/m$^2$ to about 600 g/m$^2$, about 300 g/m$^2$ to about 800 g/m$^2$, about 400 g/m$^2$ to about 700 g/m$^2$, or about 500 g/m$^2$ to about 600 g/m$^2$.

The energy absorbing layer 340 can be a corrugated layer that can include one or more pluralities of flutes. FIG. 3 depicts the energy absorbing layer 340 as corrugated or fluted layers without including face boards. However, in other examples, the energy absorbing layer 340 can be or include single face boards, single wall boards, or multi-wall boards, such as, for example, double wall boards or triple wall boards (not shown). Therefore, the energy absorbing layer 340 can include one or more corrugated or fluted layers and one or more wall boards or face boards.

For an energy absorbing layer 340 that includes one or more pluralities of flutes, the height of the flutes (e.g., the thickness of the energy absorbing layer 340) can be about 0.05 mm, about 0.1 mm, about 0.2 mm, about 0.3 mm, about 0.4 mm, or about 0.5 mm to about 0.55 mm, about 0.6 mm, about 0.65 mm, about 0.7 mm, about 0.75 mm, about 0.8 mm, about 0.85 mm, about 0.9 mm, about 0.95 mm, about 1 mm, about 1.05 mm, about 1.1 mm, about 1.15 mm, about 1.2 mm, about 1.25 mm, about 1.3 mm, about 1.35 mm, about 1.4 mm, about 1.45 mm, about 1.5 mm, about 1.55 mm, about 1.6 mm, about 1.65 mm, about 1.7 mm, about 1.75 mm, about 1.8 mm, about 1.85 mm, about 1.9 mm, about 1.95 mm, about 2 mm, about 2.05 mm, about 2.1 mm, about 2.15 mm, about 2.2 mm, about 2.25 mm, about 2.3 mm, about 2.35 mm, about 2.4 mm, about 2.45 mm, about 2.5 mm, about 2.55 mm, about 2.6 mm, about 2.65 mm, about 2.7 mm, about 2.75 mm, about 2.8 mm, about 2.85 mm, about 2.9 mm, about 2.95 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, or greater. For example, the height of the flutes (e.g., the thickness of the energy absorbing layer 340) can be about 0.5 mm to about 7 mm, about 0.5 mm to about 6 mm, about 0.5 mm to about 5 mm, about 0.5 mm to about 4 mm, about 0.5 mm to about 3 mm, about 0.5 mm to about 2 mm, about 0.5 mm to about 1.5 mm, about 0.6 mm to about 1.5 mm, about 0.7 mm to about 1.4 mm, about 0.8 mm to about 1.4 mm, about 0.9 mm to about 1.4 mm, about 0.9 mm to about 1.3 mm, about 1 mm to about 1.3 mm, about 1 mm to about 1.2 mm, about 1.1 mm to about 1.2 mm, about 1.12 mm to about 1.18 mm, about 1.12 mm to about 1.16 mm, about 1.12 mm to about 1.14 mm, about 1.14 mm to about 1.18 mm, or about 1.16 mm to about 1.18 mm. In some examples, the height of the flutes (e.g., the thickness of the energy absorbing layer 340) can be about 0.5 mm to about 7 mm, about 0.5 mm to about 6 mm, about 0.5 mm to about 5 mm, about 0.5 mm to about 4 mm, about 0.5 mm to about 3 mm, about 0.5 mm to about 2 mm, about 0.1 mm to about 2 mm, about 0.1 mm to about 1.5 mm, about 0.1 mm to about 1 mm, about 0.2 mm to about 0.9 mm, or about 0.3 mm to about 0.8 mm. In other examples, an energy absorbing layer 340 that includes one or more pluralities of flutes can include size A flutes, size B flutes, size C flutes, size E flutes, size F flutes, or any combination thereof The energy absorbing layer 340 can have one or more pluralities of flutes, each plurality of flutes can include about 50 flutes, about 75 flutes, about 100 flutes, about 150 flutes, about 200 flutes, or about 250 flutes to about 500 flutes, about 600 flutes, about 700 flutes, about 800 flutes, about 900 flutes, or about 1,000 flutes per linear meter. In some examples, each plurality of flutes in the energy absorbing layer 340 can include about 50 flutes/linear meter to about 1,000 flutes/linear meter, about 100 flutes/linear meter to about 800 flutes/linear meter, about 150 flutes/linear meter to about 700 flutes/linear meter, about 150 flutes/linear meter to about 600 flutes/linear meter, about 200 flutes/linear meter to about 600 flutes/linear meter, about 200 flutes/linear meter to about 500 flutes/linear meter, about 200 flutes/linear meter to about 400 flutes/linear meter, about 250 flutes/linear meter to about 350 flutes/linear meter, or about 280 flutes/linear meter to about 320 flutes/linear meter.

Alternatively, the energy absorbing layer 340 can be optionally sized and contain a clay-based material or a sizing agent, as well as one or more types of fibers, such as lignocellulosic fibers, natural fibers, synthetic fibers, recycled fibers, or any mixture thereof. In some examples, the energy absorbing layer 340 can contain at least one corrugated cardboard or paperboard layer and a sizing agent, at least one corrugated polymeric or oligomeric layer, or any mixture thereof. In other examples, if the energy absorbing layer 340 contains a sizing agent or a polymeric material, then the energy absorbing layer 340 can have a water vapor transmission rate of about 5, about 10, or about 15 g/645.2 cm$^2$/24 hr to about 20, about 25, about 30, about 35, about 40, about 45, about 50 g/645.2 cm$^2$/24 hr, or greater, as measured according to ASTM E96M-14, Procedure A. In some examples, the energy absorbing layer 340 can have a water vapor transmission rate of about 5 to about 50, about 10 to about 40, about 15 to about 35, or about 20 to about 30 g/645.2 cm$^2$/24 hr, as measured according to ASTM E96M-14, Procedure A.

The protection barrier 300 can also include an adhesive layer 344 disposed between the base sheet 310 and the energy absorbing layer 340, such as across the flutes 342 which contact the lower or second surface 314 of the base sheet 310. In some examples, the adhesive layer 344 can contain a starch-based adhesive. In other examples, the adhesive layer 344 can contain one or more adhesives, such as isocyanate resin, urea-formaldehyde, phenol formaldehyde, melamine formaldehyde, phenol-urea-formaldehyde resin, resorcinol-formaldehyde resin, phenol-resorcinol-formaldehyde resin, melamine-urea-formaldehyde resin, an oxidative binder, or any mixture thereof.

The protection barrier 300 can have a thickness of about 0.2 mm, about 0.5 mm, about 1 mm, about 2 mm, or about 3 mm to about 5 mm, about 6 mm, about 7 mm, about 8 mm, about 9 mm, or about 10 mm. In some examples, the protection barrier 100 and/or 200 can have a thickness of about 0.5 mm, about 0.6 mm, about 0.7 mm, about 0.8 mm, about 0.9 mm, or about 1 mm to about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.5 mm, or about 3 mm. For example, the protection barrier 300 can have a thickness of about 0.1 mm to about 10 mm, about 0.2 mm to about 5 mm, about 0.25 mm to about 2.5 mm, about 0.3 mm to about 2 mm, about 0.35 mm to about 1.5 mm, about 0.5 mm to about 10 mm, about 0.5 mm to about 8 mm, about 0.5 mm to about 5 mm, about 1 mm to about 10 mm, about 1 mm to about 8 mm, about 1 mm to about 5 mm, about 2 mm to about 10 mm, about 2 mm to about 8 mm, or about 2 mm to about 5 mm.

The protection barrier 300 can have a width and/or a length of about 0.1 m, about 0.2 m, about 0.25 m, about 0.5 m, or about 1 m to about 2 m, about 3 m, about 4 m, or about 5 m. For example, the protection barrier 300 can have a width and/or a length of about 0.2 m to about 5 m, about 0.2 m to about 4 m, about 0.2 m to about 3 m, about 0.2 m to about 2 m, about 0.2 m to about 1 m, about 0.25 m to about 2 m, about 0.25 m to about 4 m, about 0.25 m to about 6 m, about 0.4 m to about 3 m, about 0.5 m to about 5 m, about 0.5 m to about 4 m, about 0.5 m to about 3 m, about 0.5 m to about 2 m, or about 0.5 m to about 1 m.

The protection barrier 300 can have a basis weight of about 50 g/m$^2$, about 100 g/m$^2$, about 150 g/m$^2$, about 200 g/m$^2$, about 250 g/m$^2$, about 300 g/m$^2$, about 350 g/m$^2$, about 400 g/m$^2$, about 450 g/m$^2$, or about 500 g/m$^2$ to about 550 g/m$^2$, about 600 g/m$^2$, about 700 g/m$^2$, about 800 g/m$^2$, about 900 g/m$^2$, or about 1,000 g/m$^2$. For example, the protection barrier 300 can have a basis weight of about 50 g/m$^2$ to about 1,000 g/m$^2$, about 100 g/m$^2$ to about 800 g/m$^2$, about 200 g/m$^2$ to about 800 g/m$^2$, about 300 g/m$^2$ to about 600 g/m$^2$, about 300 g/m$^2$ to about 800 g/m$^2$, about 400 g/m$^2$ to about 700 g/m$^2$, or about 500 g/m$^2$ to about 600 g/m$^2$.

The protection barrier 300 can have a water vapor transmission rate of about 5, about 10, or about 15 g/645.2 cm$^2$/24 hr to about 20, about 25, about 30, about 35, about 40, about 45, about 50 g/645.2 cm$^2$/24 hr, or greater, as measured according to ASTM E96M-14, Procedure A. For example, the protection barrier 300 can have a water vapor transmission rate of about 5 to about 150, about 5 to about 100, about 5 to about 50, about 10 to about 40, about 15 to about 35, or about 20 to about 30 g/645.2 cm$^2$/24 hr, as measured according to ASTM E96M-14, Procedure A.

The protection barrier 300 can have a vapor permeability of about 5, about 10, about 15, or about 20 g/645.2 cm$^2$/24 hr to about 25, about 30, about 35, about 40, about 45, about 50, about 55, about 60, about 65, about 70, about 75, about 80, about 85, about 90, about 95, about 100, about 105, about 110, about 115, about 120, about 125, about 130, about 135, about 140, about 145, about 150 g/645.2 cm$^2$/24 hr, or greater, as measured according to ASTM E96M-14, Procedures A and B. For example, the protection barrier 300 can have a vapor permeability of about 5 to about 150, about 10 to about 50, about 15 to about 40, or about 20 to about 30 g/645.2 cm$^2$/24 hr, as measured according to ASTM E96M-14, Procedures A and B.

In some examples, the protection barrier 300 can be made by forming or otherwise making the base sheet 310 that includes one or more layers 330-334 and one or more sizing layers 320-323. Thereafter, the energy absorbing layer 340 can be adhered or otherwise secured to the base sheet 310. In other examples, the protection barrier 300 can be made by forming or otherwise making the base sheet 310 that includes one or more sizing layers 320-323 disposed between two or more layers 330-334. A first paperboard layer, such as layer 334 of the two or more layers 330-334, can form the first surface 302 of the protection barrier 300. The energy absorbing layer 340 can be adhered or otherwise secured to the base sheet 310 to form the second surface 304 of the protection barrier 300. The energy absorbing layer 340 can have a plurality of flutes 342.

In some examples, the protection barrier 300 can be made by forming or otherwise making the base sheet 310 that includes two or more layers 330-334 and one or more sizing layers 320-323. The first layer 334 can form the first surface 312 of the base sheet 310 and a second layer 330 can form the second surface 314 of the base sheet 310. The energy absorbing layer 340 having a plurality of flutes 342 can be adhered or otherwise secured to the second surface 314 of the base sheet 310, such as the second layer 330.

Figure 4:
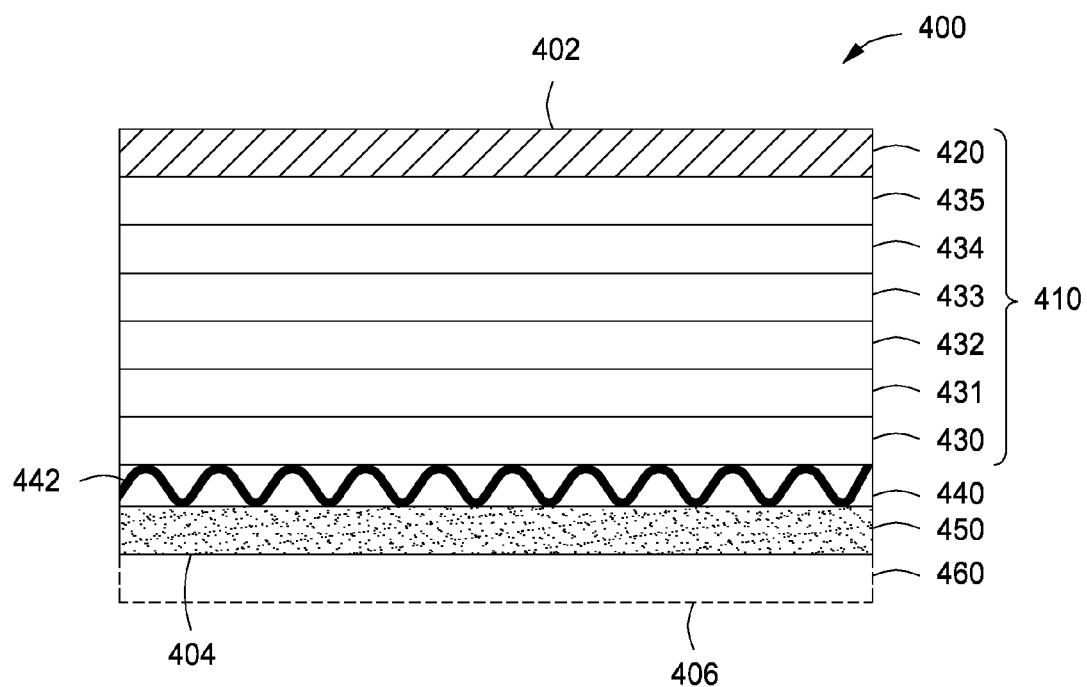
FIG. 4 depicts a cross-sectional view of an illustrative protection barrier that includes a sizing layer, at least six paperboard layers, an energy absorbing layer, a facing layer, and a scratch protective layer, according to one or more embodiments described.

In other examples, the protection barrier 300 can be installed, placed, attached, adhered, secured, or otherwise disposed on or to a surface, such as in a building or other structure. The surface can be one or more floors, decks, walls, countertops, cabinets, stairs, elevator interior surfaces, painted surfaces, concrete or cement surfaces, any other surface desired to be protected. The surface can include one or more of stone, rock, granite, quartz, terrazzo, marble, ceramic, concrete, colored concrete, brick, mortar, tile, masonry material, wood, plastic, linoleum, glass, metal, composite flooring, composite countertops, or any mixture thereof FIG. 4 depicts a cross-sectional view of an illustrative protection barrier 400, according to one or more embodiments. The protection barrier 400 can include a base sheet 410 having one or more sizing layers 420 and one or more paperboard layers (six are shown, 430, 431, 432, 433, 434, and 435). The protection barrier 400 can also include an energy absorbing layer 440 having a plurality of flutes 442 and a facing layer 450 disposed on the base sheet 410. In one example, as shown in FIG. 4, the base sheet 410 can have one layer of the sizing layer 420 and a plurality of the layers 430-435, such as six paperboard layers. In other examples, the base sheet 410 can have a single layer, two layers, three layers, or up to about ten or more layers of the sizing layer 420 and independently have one layer to about 10 layers or more of the layers 430-435. Therefore, the plurality of layers 430-435 can be disposed between the sizing layer 420 and the facing layer 450, and the energy absorbing layer 440 can be disposed between the plurality of layers 430-435 and the facing layer 450.

In some examples, the sizing layer 420 can form a first or upper surface 402 of the protection barrier 400 and the facing layer 450 can form a second or lower surface 404 of the protection barrier 400, as depicted in FIG. 4. In other examples, an optional scratch protective layer 460 can be disposed on the facing layer 450 to form a second or lower surface 406 of the protection barrier 400, as illustrated by phantom in FIG. 4.

Figure 5:
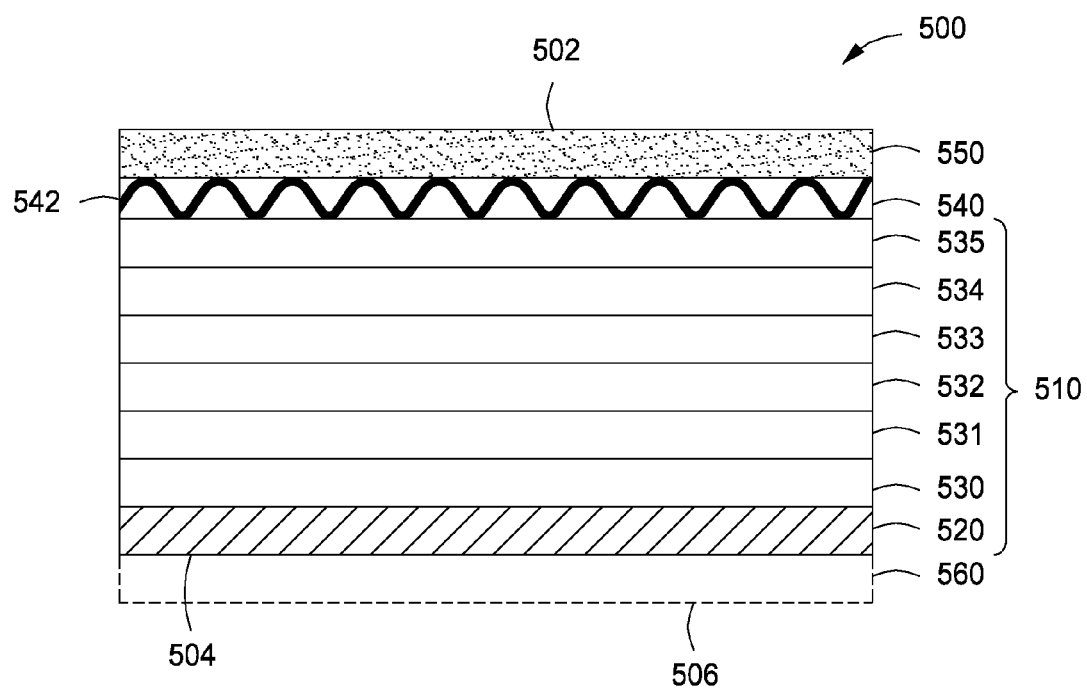
FIG. 5 depicts a cross-sectional view of yet another illustrative protection barrier that includes a sizing layer, at least six paperboard layers, an energy absorbing layer, a facing layer, and a scratch protective layer, according to one or more embodiments described.

FIG. 5 depicts a cross-sectional view of an illustrative protection barrier 500, according to one or more embodiments. The protection barrier 500 can include the energy absorbing layer 540 disposed between the facing layer 550 and the optional scratch protective layer 560, the plurality of paperboard layers (six are shown, 530, 531, 532, 533, 534, and 535) can be disposed between the energy absorbing layer 540 and the scratch protective layer 560, and the sizing layer 520 can be disposed between the plurality of layers 530-535 and the scratch protective layer 560.

In some examples, the facing layer 550 can form a first or upper surface 502 of the protection barrier 500 and the optional scratch protective layer 560 can form a second or "lower" surface 506 of the protection barrier 500, as illustrated by phantom in FIG. 5. In other examples, the optional scratch protective layer 560 can be omitted, the facing layer 550 can form the first or "upper" surface 502 of the protection barrier 500 and the sizing layer 520 can form a second or lower surface 504 of the protection barrier 500.

The protection barrier 400 and/or 500 can have a thickness of about 0.2 mm, about 0.5 mm, about 1 mm, about 2 mm, or about 3 mm to about 5 mm, about 6 mm, about 7 mm, about 8 mm, about 9 mm, or about 10 mm. In some examples, the protection barrier 400 and/or 500 can have a thickness of about 0.5 mm, about 0.6 mm, about 0.7 mm, about 0.8 mm, about 0.9 mm, or about 1 mm to about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.5 mm, or about 3 mm. For example, the protection barrier 400 and/or 500 can have a thickness of about 0.1 mm to about 10 mm, about 0.2 mm to about 5 mm, about 0.25 mm to about 2.5 mm, about 0.3 mm to about 2 mm, about 0.35 mm to about 1.5 mm, about 0.5 mm to about 10 mm, about 0.5 mm to about 8 mm, about 0.5 mm to about 5 mm, about 1 mm to about 10 mm, about 1 mm to about 8 mm, about 1 mm to about 5 mm, about 2 mm to about 10 mm, about 2 mm to about 8 mm, or about 2 mm to about 5 mm.

The protection barrier 400 and/or 500 can have a width and/or a length of about 0.1 m, about 0.2 m, about 0.25 m, about 0.5 m, or about 1 m to about 2 m, about 3 m, about 4 m, or about 5 m. For example, the protection barrier 400 and/or 500 can have a width and/or a length of about 0.2 m to about 5 m, about 0.2 m to about 4 m, about 0.2 m to about 3 m, about 0.2 m to about 2 m, about 0.2 m to about 1 m, about 0.25 m to about 2 m, about 0.25 m to about 4 m, about 0.25 m to about 6 m, about 0.4 m to about 3 m, about 0.5 m to about 5 m, about 0.5 m to about 4 m, about 0.5 m to about 3 m, about 0.5 m to about 2 m, or about 0.5 m to about 1 m.

The protection barrier 400 and/or 500 can have a basis weight of about 50 g/m$^2$, about 100 g/m$^2$, about 150 g/m$^2$, about 200 g/m$^2$, about 250 g/m$^2$, about 300 g/m$^2$, about 350 g/m$^2$, about 400 g/m$^2$, about 450 g/m$^2$, or about 500 g/m$^2$ to about 550 g/m$^2$, about 600 g/m$^2$, about 700 g/m$^2$, about 800 g/m$^2$, about 900 g/m$^2$, or about 1,000 g/m$^2$. For example, the protection barrier 400 and/or 500 can have a basis weight of about 50 g/m$^2$ to about 1,000 g/m$^2$, about 100 g/m$^2$ to about 800 g/m$^2$, about 150 g/m$^2$ to about 800 g/m$^2$, about 200 g/m$^2$ to about 700 g/m$^2$, about 200 g/m$^2$ to about 800 g/m$^2$, about 300 g/m$^2$ to about 600 g/m$^2$, about 300 g/m$^2$ to about 800 g/m$^2$, about 400 g/m$^2$ to about 700 g/m$^2$, or about 500 g/m$^2$ to about 600 g/m$^2$.

The protection barrier 400 and/or 500 can have a vapor permeability of about 5, about 10, about 15, or about 20 g/645.2 cm$^2$/24 hr to about 25, about 30, about 35, about 40, about 45, about 50, about 55, about 60, about 65, about 70, about 75, about 80, about 85, about 90, about 95, about 100, about 105, about 110, about 115, about 120, about 125, about 130, about 135, about 140, about 145, about 150 g/645.2 cm$^2$/24 hr, or greater, as measured according to ASTM E96M-14, Procedure A. In some examples, the protection barrier 400 and/or 500 can have a vapor permeability of about 5 to about 150, about 10 to about 50, about 15 to about 40, or about 20 to about 30 g/645.2 cm$^2$/24 hr, as measured according to ASTM E96M-14, Procedure A.

FIGS. 4 and 5 depict the protection barrier 400, 500 that can have one or more sizing layers 420, 520. The sizing layer 420, 520 can have a water vapor transmission rate of about 5, about 10, or about 15 g/645.2 cm$^2$/24 hr to about 20, about 25, about 30, about 35, about 40, about 45, about 50 g/645.2 cm$^2$/24 hr, or greater, as measured according to ASTM E96M-14, Procedure A. In some examples, the sizing layers 420, 520 can independently have a water vapor transmission rate of about 5 to about 150, about 5 to about 100, about 5 to about 50, about 10 to about 40, about 15 to about 35, or about 20 to about 30 g/645.2 cm$^2$/24 hr, as measured according to ASTM E96M-14, Procedure A.

The protection barrier 400 and/or 500 can have a vapor permeability of about 5, about 10, about 15, or about 20 g/645.2 cm$^2$/24 hr to about 25, about 30, about 35, about 40, about 45, about 50, about 55, about 60, about 65, about 70, about 75, about 80, about 85, about 90, about 95, about 100, about 105, about 110, about 115, about 120, about 125, about 130, about 135, about 140, about 145, about 150 g/645.2 cm$^2$/24 hr, or greater, as measured according to ASTM E96M-14, Procedures A and B. In some examples, the protection barrier 400 and/or 500 can have a vapor permeability of about 5 to about 150, about 10 to about 50, about 15 to about 40, or about 20 to about 30 g/645.2 cm$^2$/24 hr, as measured according to ASTM E96M-14, Procedures A and B.

The sizing layer 420, 520 can have a dry rigidity of about 175, about 185, about 195, about 205, or about 215 grams per 6.35 mm of deflection to about 220, about 230, about 240, about 250, about 260, about 262, about 265, or about 270 grams per 6.35 mm of deflection. For example, each of the sizing layer 420, 520 can have a dry rigidity of about 175 to about 270, about 175 to about 262, about 185 to about 270, or about 185 to about 265 grams per 6.35 mm of deflection.

The sizing layer 420, 520 can include lignocellulosic fibers, natural fibers, synthetic fibers, recycled fibers, or any mixture thereof. The sizing layer 420, 520 can include a plurality of fibers and one or more sizing agents. The sizing layer 420, 520 can include one or more sizing agents, such as clay-based materials, rosins or rosin-based compounds, latex or latex-based materials, starches or modified starches, gelatin, waxes, acrylic copolymers, AKD, ASA, PAE, SMA, SMI, SAE, SAA, EAA, PUR, a rosin and ASA composition, a gelatin and PLR composition, or any mixture thereof.

Each of the sizing layers 420, 520 can have a thickness of about 0.001 mm, about 0.005 mm, about 0.01 mm, about 0.02 mm, about 0.03 mm, about 0.04 mm, about 0.05 mm, about 0.1 mm, or about 0.15 mm to about 0.25 mm, about 0.5 mm, about 0.75 mm, about 1 mm, about 1.25 mm, about 1.5 mm, about 1.75 mm, about 2 mm, or greater. For example, each of the sizing layers 420, 520 can have a thickness of about 0.05 mm to about 2 mm, about 0.1 mm to about 2 mm, about 0.2 mm to about 2 mm, about 0.05 mm to about 1 mm, about 0.1 mm to about 0.25 mm, about 0.1 mm to about 0.25 mm, about 0.1 mm to about 1 mm, about 0.2 mm to about 1 mm, or about 0.5 mm to about 1 mm.

Each of the sizing layers 420, 520 can have a basis weight of about 1 $g/m^2$, about 5 $g/m^2$, about 10 $g/m^2$, about 15 $g/m^2$, about 20 $g/m^2$, about 25 $g/m^2$, or about 30 $g/m^2$, to about 60 $g/m^2$, about 70 $g/m^2$, about 80 $g/m^2$, about 90 $g/m^2$, about 100 $g/m^2$, or about 150 $g/m^2$. For example, each of the sizing layers 420, 520 can have a basis weight of about 1 $g/m^2$ to about 150 $g/m^2$, about 5 $g/m^2$ to about 100 $g/m^2$, about 10 $g/m^2$ to about 100 $g/m^2$, about 20 $g/m^2$ to about 100 $g/m^2$, about 30 $g/m^2$ to about 100 $g/m^2$, about 10 $g/m^2$ to about 90 $g/m^2$, about 10 $g/m^2$ to about 80 $g/m^2$, about 20 $g/m^2$ to about 80 $g/m^2$, about 20 $g/m^2$ to about 90 $g/m^2$, about 30 $g/m^2$ to about 70 $g/m^2$, about 30 $g/m^2$ to about 80 $g/m^2$, or about 40 $g/m^2$ to about 60 $g/m^2$.

FIGS. 4 and 5 depict the protection barrier 400, 500 that can have one or more layers 430-435, 530-535. Each of the layers 430-435, 530-535 can include lignocellulosic fibers, natural fibers, synthetic fibers, recycled fibers, or any mixture thereof. Each of the layers 430-435, 530-535 can include two paperboard layers or more, two paperboard layers or more, three paperboard layers or more, four paperboard layers or more, five paperboard layers or more, six paperboard layers or more, seven paperboard layers or more, eight paperboard layers or more, nine paperboard layers or more, ten paperboard layers or more. Alternatively, one or more of layers 430-435, 530-535 can independently include a sizing agent. In some examples, two, three, or more of layers 430-435, 530-535, such as, for example, the layers 430-432, 530-532, can include sizing agents.

The sizing layers 420 and/or 520 can have the OGR property for providing a barrier to one or more oils, greases, fats, or other organic-based compounds or materials. Illustrative organic-based compounds or materials can include, but are not limited to, oils, greases, fats, organic solvents, motor oil, hydraulic fluid, brake fluid, automatic transmission fluid, or any mixture thereof. In some examples, one or more of the layers 430-435, 530-535 and/or the energy absorbing layers 440 and/or 540 can independently have the OGR properties as the sizing layers 420 and/or 520.

In one aspect, the OGR property can be measured or otherwise determined by using a test kit referred to as the "3M Test Kit" (TAPPI T-559 standard test for Grease Resistance for Paper and Paperboard, established by the Technical Association of the Pulp and Paper Industry, Norcross, Ga., USA; and commercially available from 3M Company, St. Paul, Minn., USA). The "3M Test Kit" includes 12 solutions composed of castor oil, toluene, and n-heptane having various concentrations. Each oil solution can be applied to a sample portion of the sizing layers 420 and/or 520. The highest numbered solution (the most aggressive) that remains on the surface of the sizing layers 420 and/or 520 without causing failure (e.g., soaking through the layer) is scored as integers from 0 to 12 (worst to best) based on the liquid wetting and penetrating and is reported as the OGR value. The test can be repeated multiple times and the average OGR value can be calculated for each sample.

The sizing layers 420 and/or 520 can independently have an average OGR value of about 6, about 6.2, about 6.4, about 6.6, about 6.8, about 7, about 7.2, about 7.4, about 7.6, about 7.8, about 8, about 8.2, about 8.4, about 8.6, about 8.8, about 9, about 9.2, about 9.4, about 9.6, about 9.8, about 10, about 10.1, about 10.2, about 10.3, about 10.4, about 10.5, about 10.6, about 10.7, about 10.8, about 10.9, about 11, about 11.1, about 11.2, about 11.3, about 11.4, about 11.5, about 11.6, about 11.7, about 11.8, about 11.9, about 12, as measured according to TAPPI T-559 standard test for Grease Resistance for Paper and Paperboard. In some examples, the sizing layers 420 and/or 520 can independently have an OGR value or an average OGR value of about 6 to about 12, about 8 to about 12, about 10 to about 12, about 8 to about 11, or about 6 to about 10, as measured according to TAPPI T-559 standard test for Grease Resistance for Paper and Paperboard.

The OGR property of the protection barriers 400 and 500 can be measured or otherwise determined by using a boat float test, according to the Georgia-Pacific Flotation Paper Saturation Test STP-415. In the boat float test, the protection barriers 400 and 500 are folded into a boat-shaped sample, then floated in a wetting solution for a given time period. An OGR flotation value can be determine by the amount of time that the boat-shaped samples have successfully remained floating in the wetting solution (as opposed to sinking in the wetting solution). The wetting solution can be or include one or more organic based compounds, oils, greases, organic solvents, standardized hydrocarbon solution, such as motor oil, hydraulic fluid, brake fluid, automatic transmission fluid, any of the solutions from the 3M Test Kit (e.g., solutions can include castor oil, toluene, or n-heptane), or any mixture thereof. As used herein, unless otherwise noted, the OGR flotation values can be measured according to the Georgia-Pacific Flotation Paper Saturation Test STP-415 with automotive brake fluid at a temperature of about 100° C.

In some examples, the protection barriers 400, 500 can be folded into a boat-shaped sample, such as by folding about 2.54 cm of each side of a square sample having side lengths of about 15.24 cm for each protection barrier 400, 500. Each protection barrier 400, 500 can be folded so that the upper surfaces 402, 502 are facing inwards and upwards so to be within the boat-shaped sample while the lower surfaces 404, 504 are facing downwards and outwards so to be outside of the boat-shaped sample. Each of the corners of the boat-shaped sample can be stapled. The wetting solution (e.g., hydraulic fluid or automotive brake fluid) contained within a vat can be heated and maintained at about 100° C. The boat-shaped samples of the protection barriers 400, 500 can be placed into heated wetting solution such that the upper surfaces 402, 502 are disposed facing away from the wetting solution and the lower surfaces 404, 504 are disposed facing into the heated wetting solution. The time that the boat-shaped samples of the protection barriers 400, 500 can be monitored and recorded for any time period, such as, for example, about 30 seconds or about 3 months.

In some examples, the protection barriers 400 and/or 500 can have an OGR flotation value of about 0.1 hr, about 0.5 hr, about 1 hr, about 2 hr, about 3 hr, about 4 hr, about 5 hr, about 6 hr, about 7 hr, about 8 hr, about 9 hr, about 10 hr, about 11 hr, about 12 hr, about 13 hr, about 14 hr, about 15 hr, about 16 hr, about 17 hr, about 18 hr, about 19 hr, about 20 hr, about 21 hr, about 22 hr, about 23 hr, about 24 hr, about 25 hr, about 26 hr, about 27 hr, about 28 hr, about 29 hr, about 30 hr, about 50 hr, about 100 hr, or longer, as measured according to the Georgia-Pacific Flotation Paper Saturation Test STP-415. In some specific examples, the protection barriers 400 and/or 500 can have an OGR flotation value of about 4 hr to about 24 hr. In other specific examples, the protection barriers 400 and/or 500 can have an OGR flotation value of about 8 hr to about 24 hr. In other specific examples, the protection barriers 400 and/or 500 can have an OGR flotation value of greater than 24 hr or greater than 48 hr.

The OGR property of the protection barriers 400 and 500 can also be measured or otherwise determined by using a spill catch test. In the spill catch test, a sample of the protection barrier 400 or 500 is disposed onto a flooring surface, then a wetting fluid is added to the upper surface 502 or 502. After a given time period, the flooring surface is checked for the presence of the wetting fluid. An OGR spill-catch value can be determine by the maximum amount of time that lapsed from exposing the wetting fluid to the sample to the time the flooring surface is checked and remains free of the wetting fluid. The protection barrier sample can be a square sample having side lengths of about 15.24 cm for each protection barrier 400, 500. The wetting fluid can be in an amount of about 10 mL and can be or include one or more organic based fluids, such as oils, greases, organic solvents, motor oil, hydraulic fluid, brake fluid, automatic transmission fluid, standardized hydrocarbon solutions, such as any of the solutions from the 3M Test Kit, or any mixture thereof. The samples of the protection barriers 400, 500 can be monitored and recorded for any time period, such as, for example, from about 15 minutes to about 24 hours or about 7 days. As used herein, unless otherwise noted, the OGR spill-catch values are provided in reference to 10 mL of automatic transmission fluid at a temperature of about 23° C.

In some examples, the protection barriers 400 and/or 500 can have an OGR spill-catch value of about 0.1 hr, about 0.5 hr, or about 1 hr to about 1.5 hr, about 2 hr, about 3 hr, about 4 hr, about 5 hr, about 6 hr, about 7 hr, about 8 hr, about 9 hr, about 10 hr, about 11 hr, about 12 hr, about 13 hr, about 14 hr, about 15 hr, about 16 hr, about 17 hr, about 18 hr, about 19 hr, about 20 hr, about 21 hr, about 22 hr, about 23 hr, about 24 hr, about 25 hr, about 26 hr, about 27 hr, about 28 hr, about 29 hr, about 30 hr, about 50 hr, about 100 hr, or longer. In some specific examples, the protection barriers 400 and/or 500 can have an OGR spill-catch value of about 0.5 hr to about 24 hr. In other specific examples, the protection barriers 400 and/or 500 can have an OGR spill-catch value of about 1 hr to about 18 hr. In other specific examples, the protection barriers 400 and/or 500 can have an OGR spill-catch value of greater than 24 hr or greater than 48 hr.

Each of the layers 430-435, 530-535 can have a water absorbency of about 0.01 g/g (g of water per 1 g of the paperboard layer at about 23° C.), about 0.03 g/g, about 0.05 g/g, about 0.07 g/g, about 0.1 g/g, about 0.15 g/g, about 0.2 g/g, about 0.3 g/g, about 0.5 g/g, about 0.7 g/g, about 1 g/g, about 1.3 g/g, or about 1.5 g/g to about 2 g/g, about 2.5 g/g, about 3 g/g, about 3.5 g/g, about 4 g/g, about 4.5 g/g, about 5 g/g, about 6 g/g, about 7 g/g, about 8 g/g, about 9 g/g, or about 10 g/g. Each of the layers 430-435, 530-535 can have a water absorbency of at least 0.05 g/g, at least 0.07 g/g, at least 0.1 g/g, at least 0.13 g/g, at least 0.15 g/g, at least 0.2 g/g, at least 0.3 g/g, at least 0.4 g/g, at least 0.5 g/g, at least 0.6 g/g, at least 0.7 g/g, at least 0.8 g/g, at least 0.9 g/g, at least 1 g/g, or at least 1.1 g/g and up to about 1.5 g/g, about 2 g/g, about 2.5 g/g, about 3 g/g, about 4 g/g, about 5 g/g, about 6 g/g, or about 7 g/g. For example, each of the layers 430-435, 530-535 can have a water absorbency of about 0.01 g/g to about 5 g/g, about 0.1 g/g to about 7 g/g, about 0.1 g/g to about 6 g/g, about 0.1 g/g to about 5 g/g, about 0.1 g/g to about 4 g/g, about 0.1 g/g to about 3 g/g, about 1 g/g to about 7 g/g, about 1 g/g to about 6 g/g, about 1 g/g to about 5 g/g, about 1 g/g to about 4 g/g, or about 1 g/g to about 3 g/g. The water absorbency can be measured according to the Cobb test for a time of 180 seconds and a temperature of about 23° C.

Each of the layers 430-435, 530-535 can have a void volume ratio of about 1, about 2, about 3, or about 4 to about 7, about 8, about 9, or about 10. For example, each of the layers 430-435, 530-535 can have a void volume ratio of at least 1, at least 1.5, at least 2, at least 2.5, at least 3, at least 3.5, or at least 4 and up to about 7, about 8, about 9, or about 10.

Each of the layers 430-435, 530-535 can have a thickness of about 0.001 mm, about 0.005 mm, about 0.01 mm, about 0.02 mm, about 0.03 mm, about 0.04 mm, about 0.05 mm, about 0.1 mm, or about 0.15 mm to about 0.25 mm, about 0.5 mm, about 0.75 mm, about 1 mm, about 1.25 mm, about 1.5 mm, about 1.75 mm, about 2 mm, or greater. For example, each of the layers 430-435, 530-535 can have a thickness of about 0.05 mm to about 2 mm, about 0.1 mm to about 2 mm, about 0.2 mm to about 2 mm, about 0.05 mm to about 1 mm, about 0.1 mm to about 0.25 mm, about 0.1 mm to about 0.25 mm, about 0.1 mm to about 1 mm, about 0.2 mm to about 1 mm, or about 0.5 mm to about 1 mm, Each of the layers 430-435, 530-535 can have a basis weight of about 1 g/m$^2$, about 5 g/m$^2$, about 10 g/m$^2$, about 15 g/m$^2$, about 20 g/m$^2$, about 25 g/m$^2$, or about 30 g/m$^2$, to about 60 g/m$^2$, about 70 g/m$^2$, about 80 g/m$^2$, about 90 g/m$^2$, about 100 g/m$^2$, or about 150 g/m$^2$. For example, each of the layers 430-435, 530-535 can have a basis weight of about 1 g/m$^2$ to about 150 g/m$^2$, about 5 g/m$^2$ to about 100 g/m$^2$, about 10 g/m$^2$ to about 100 g/m$^2$, about 20 g/m$^2$ to about 100 g/m$^2$, about 30 g/m$^2$ to about 100 g/m$^2$, about 10 g/m$^2$ to about 90 g/m$^2$, about 10 g/m$^2$ to about 80 g/m$^2$, about 20 g/m$^2$ to about 80 g/m$^2$, about 20 g/m$^2$ to about 90 g/m$^2$, about 30 g/m$^2$ to about 70 g/m$^2$, about 30 g/m$^2$ to about 80 g/m$^2$, or about 40 g/m$^2$ to about 60 g/m$^2$.

The protection barrier 400, 500 can have one or more adhesive layers (not shown). In some examples, a plurality of adhesive layers can be secured or otherwise disposed on and/or between the sizing layers 420, 520 and/or the layers 430-435, 530-535. In one example, each of the layers 430-435, 530-535 and each of the adhesive layers can be sequentially disposed on one another, or each of the adhesive layers can be disposed on each of the layers 430-435, 530-535. The adhesive layers can include one or more adhesives. Exemplary adhesive can include starched-based adhesive, isocyanate resin, urea-formaldehyde, phenol formaldehyde, melamine formaldehyde, phenol-urea-formaldehyde resin, resorcinol-formaldehyde resin, phenol-resorcinol-formaldehyde resin, melamine-urea-formaldehyde resin, an oxidative binder, or any mixture thereof.

FIGS. 4 and 5 depict the protection barrier 400, 500 that can have the energy absorbing layer 440, 540 and the flutes 442, 542 formed therein. The energy absorbing layer 440, 540 and the flutes 442, 542 can independently include or contain one or more types of fibers, such as lignocellulosic fibers, natural fibers, synthetic fibers, recycled fibers, or any mixture thereof. Alternatively, the energy absorbing layer 440, 540 can independently include a clay-based material or a sizing agent, as well as one or more types of fibers, as discussed above.

The energy absorbing layers 440 and/or 540 can independently be a corrugated layer that can include one or more pluralities of flutes 442, 542. FIGS. 4 and 5 depict the energy absorbing layers 440 and 540 as corrugated or fluted layers without including face boards. However, in other examples, the energy absorbing layers 440 and 540 can be or include single face boards, single wall boards, or multi-wall boards, such as, for example, double wall boards or triple wall boards (not shown). Therefore, each of the energy absorbing layer 440 or 540 can independently include one or more corrugated or fluted layers and one or more wall boards or face boards.

The height of the flutes 442, 542 and/or the thickness of the energy absorbing layers 440 and/or 540 can independently include the sum of the vertical height from an equilibrium point to the highest point of a flute's crest and the vertical depth from the equilibrium point to the lowest point of a flute's trough. The height of the flutes 442, 542 and/or the thickness of the energy absorbing layer 440, 540 can be about 0.05 mm, about 0.1 mm, about 0.2 mm, about 0.3 mm, about 0.4 mm, or about 0.5 mm to about 0.55 mm, about 0.6 mm, about 0.65 mm, about 0.7 mm, about 0.75 mm, about 0.8 mm, about 0.85 mm, about 0.9 mm, about 0.95 mm, about 1 mm, about 1.05 mm, about 1.1 mm, about 1.15 mm, about 1.2 mm, about 1.25 mm, about 1.3 mm, about 1.35 mm, about 1.4 mm, about 1.45 mm, about 1.5 mm, about 1.55 mm, about 1.6 mm, about 1.65 mm, about 1.7 mm, about 1.75 mm, about 1.8 mm, about 1.85 mm, about 1.9 mm, about 1.95 mm, about 2 mm, about 2.05 mm, about 2.1 mm, about 2.15 mm, about 2.2 mm, about 2.25 mm, about 2.3 mm, about 2.35 mm, about 2.4 mm, about 2.45 mm, about 2.5 mm, about 2.55 mm, about 2.6 mm, about 2.65 mm, about 2.7 mm, about 2.75 mm, about 2.8 mm, about 2.85 mm, about 2.9 mm, about 2.95 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, or greater. For example, the height of the flutes 442, 542 and/or the thickness of the energy absorbing layer 440, 540 can be about 0.5 mm to about 7 mm, about 0.5 mm to about 6 mm, about 0.5 mm to about 5 mm, about 0.5 mm to about 4 mm, about 0.5 mm to about 3 mm, about 0.5 mm to about 2 mm, about 0.5 mm to about 1.5 mm, about 0.6 mm to about 1.5 mm, about 0.7 mm to about 1.4 mm, about 0.8 mm to about 1.4 mm, about 0.9 mm to about 1.4 mm, about 0.9 mm to about 1.3 mm, about 1 mm to about 1.3 mm, about 1 mm to about 1.2 mm, about 1.1 mm to about 1.2 mm, about 1.12 mm to about 1.18 mm, about 1.12 mm to about 1.16 mm, about 1.12 mm to about 1.14 mm, about 1.14 mm to about 1.18 mm, or about 1.16 mm to about 1.18 mm. In some examples, the height of the flutes 442, 542 and/or the thickness of the energy absorbing layer 440, 540 can be about 0.5 mm to about 7 mm, about 0.5 mm to about 6 mm, about 0.5 mm to about 5 mm, about 0.5 mm to about 4 mm, about 0.5 mm to about 3 mm, about 0.5 mm to about 2 mm, about 0.1 mm to about 2 mm, about 0.1 mm to about 1.5 mm, about 0.1 mm to about 1 mm, about 0.2 mm to about 0.9 mm, or about 0.3 mm to about 0.8 mm. The pluralities of flutes 442, 542 can include size A flutes, size B flutes, size C flutes, size E flutes, size F flutes, or any combination thereof The energy absorbing layer 440, 540 can have a basis weight of about 50 g/m², about 100 g/m², about 150 g/m², about 200 g/m², about 250 g/m², about 300 g/m², about 350 g/m², about 400 g/m², about 450 g/m², or about 500 g/m² to about 550 g/m², about 600 g/m², about 700 g/m², about 800 g/m², about 900 g/m², or about 1,000 g/m². For example, the energy absorbing layer 440, 540 can have a basis weight of about 50 g/m² to about 1,000 g/m², about 50 g/m² to about 400 g/m², about 100 g/m² to about 800 g/m², about 100 g/m² to about 200 g/m², about 110 g/m² to about 160 g/m², about 200 g/m² to about 800 g/m², about 300 g/m² to about 600 g/m², about 300 g/m² to about 800 g/m², about 400 g/m² to about 700 g/m², or about 500 g/m² to about 600 g/m².

The energy absorbing layer 440, 540 can include one or more pluralities of flutes, each plurality of flutes can include about 50 flutes, about 75 flutes, about 100 flutes, about 150 flutes, about 200 flutes, or about 250 flutes to about 500 flutes, about 600 flutes, about 700 flutes, about 800 flutes, about 900 flutes, or about 1,000 flutes per linear meter. In some examples, each plurality of flutes in the energy absorbing layer 440, 540 can include about 50 flutes/linear meter to about 1,000 flutes/linear meter, about 100 flutes/linear meter to about 800 flutes/linear meter, about 150 flutes/linear meter to about 700 flutes/linear meter, about 150 flutes/linear meter to about 600 flutes/linear meter, about 200 flutes/linear meter to about 600 flutes/linear meter, about 200 flutes/linear meter to about 500 flutes/linear meter, about 200 flutes/linear meter to about 400 flutes/linear meter, about 250 flutes/linear meter to about 350 flutes/linear meter, or about 280 flutes/linear meter to about 320 flutes/linear meter.

FIGS. 4 and 5 depict the protection barrier 400, 500 that can also have one or more facing layers 450, 550. The facing layer 450, 550 can include lignocellulosic fibers, natural fibers, synthetic fibers, recycled fibers, or any mixture thereof. The facing layer 450, 550 can include gypsum wallboard facing paper, cardboard, paperboard, kraft paper, manila paper, newsliner paper, nylon, polyester, polypropylene, polyethylene, rayon, or any mixture thereof. In some examples, the facing layer 450, 550 can have a thickness of about 0.05 mm to about 2 mm or about 0.1 mm to about 0.25 mm, and the facing layer 450, 550 can have a basis weight of about 50 g/m² to 500 g/m², such as, for example, about 244 g/m² to 293 g/m². In other examples, the facing layer 450, 550 can have a thickness of about 0.05 mm to about 2 mm or about 0.1 mm to about 0.25 mm and the facing layer 450, 550 can have a basis weight of about 1 g/m² to about 150 g/m², about 10 g/m² to about 100 g/m², about 20 g/m² to about 90 g/m², or about 30 g/m² to about 70 g/m².

FIGS. 4 and 5 depict the protection barrier 400, 500 that can also have one or more scratch protective layers 460, 560. In some examples, the scratch protective layer 460, 560 can have a thickness of about 0.05 mm to about 2 mm, and can have a basis weight of about 1 g/m² to about 150 g/m². In other examples, the scratch protective layers 460, 560 can have a thickness of about 0.05 mm to about 2 mm or about 0.1 mm to about 0.25 mm and the scratch protective layers 460, 560 can have a basis weight of about 1 g/m² to about 150 g/m², about 10 g/m² to about 100 g/m², about 20 g/m² to about 90 g/m², or about 30 g/m² to about 70 g/m². The scratch protective layer 460, 560 can have a water vapor transmission rate of about 5 g/645.2 cm²/24 hr to about 50 g/645.2 cm²/24 hr, as measured according to ASTM E96M-14, Procedure A. The scratch protective layer 460, 560 can have a Mohs hardness of about 2 or less, about 1.8 or less, about 1.6 or less, about 1.4 or less, about 1.2 or less, or about 1 or less.

Generally, the scratch protective layer 460, 560 can include lignocellulosic fibers, natural fibers, synthetic fibers, recycled fibers, or any mixture thereof. In some examples, the scratch protective layer 460, 560 can include one or more of the following: an airlaid material or fabric; a cross-woven polyolefin wrap that provides a water and air resistant barrier; a mixture of about 5 wt % to about 95 wt % cellulosic fibers and about 5 wt % to about 95 wt % polymer fibers, and the polymer fibers can be bicomponent fibers having an inner core comprising a first polymer and an outer layer comprising a second polymer, and wherein the first polymer and the second polymer can be different from one another; a mixture of cellulosic fibers and polymer fibers, such that the polymer fibers can include bicomponent fibers, the bicomponent fibers can include a sheath and a core, the sheath can include a first polymer and a melt additive, the core can include a second polymer, the first and second polymers can be different, and a melting point of the first polymer can be less than a melting point of the second polymer; or a non-woven sheet containing a mixture of cellulosic fibers and polymer fibers, the cellulosic fibers can be present in an amount of about 5 wt % to about 95 wt %, based on the combined weight of the cellulosic fibers and the polymer fibers.

In some examples, the protection barrier 400 can include at least one or more adhesives secured or otherwise disposed at interfaces between: the sizing layer 420 and an upper layer 435 of the plurality of layers 430-435; a lower layer 430 of the plurality of layers 430-435 and the energy absorbing layer 440; and/or the energy absorbing layer 440 and the facing layer 450. In other examples, the protection barrier 500 can include at least one or more adhesives secured or otherwise disposed at interfaces between the facing layer 550 and the energy absorbing layer 540; the layer 535 and the energy absorbing layer 540; and/or the layer 530 and the sizing layer 520. In other examples, the protection barrier 500 can include at least one or more adhesives secured or otherwise disposed at interfaces between: the facing layer 550 and the energy absorbing layer 540; the energy absorbing layer 540 and an upper layer 530-535 of the plurality of layers 530-535; a lower layer 530-535 of the plurality of layers 530-535 and the sizing layer 520; and/or the sizing layer 520 and the scratch protective layer 560. The one or more adhesives can include one or more of isocyanate resin, urea-formaldehyde, phenol formaldehyde, melamine formaldehyde, phenol-urea-formaldehyde resin, resorcinol-formaldehyde resin, phenol-resorcinol-formaldehyde resin, melamine-urea-formaldehyde resin, an oxidative binder, or any mixture thereof Alternatively, the energy absorbing layers 440 and/or 540 can optionally further include one or more sizing agents. Suitable sizing agents can include those discussed and described above with reference to the sizing layers 119, 219, 420, and/or 520. If the energy absorbing layers 440 and/or 540 contain a sizing agent or a polymeric material, then the energy absorbing layers 440 and/or 540 can have a water vapor transmission rate of about 5, about 10, or about 15 g/645.2 cm$^2$/24 hr to about 20, about 25, about 30, about 35, about 40, about 45, about 50 g/645.2 cm$^2$/24 hr, or greater, as measured according to ASTM E96M-14, Procedure A. For example, the energy absorbing layers 440 and/or 540 can have a water vapor transmission rate of about 5 to about 50, about 10 to about 40, about 15 to about 35, or about 20 to about 30 g/645.2 cm$^2$/24 hr, as measured according to ASTM E96M-14, Procedure A.

Figure 6A:
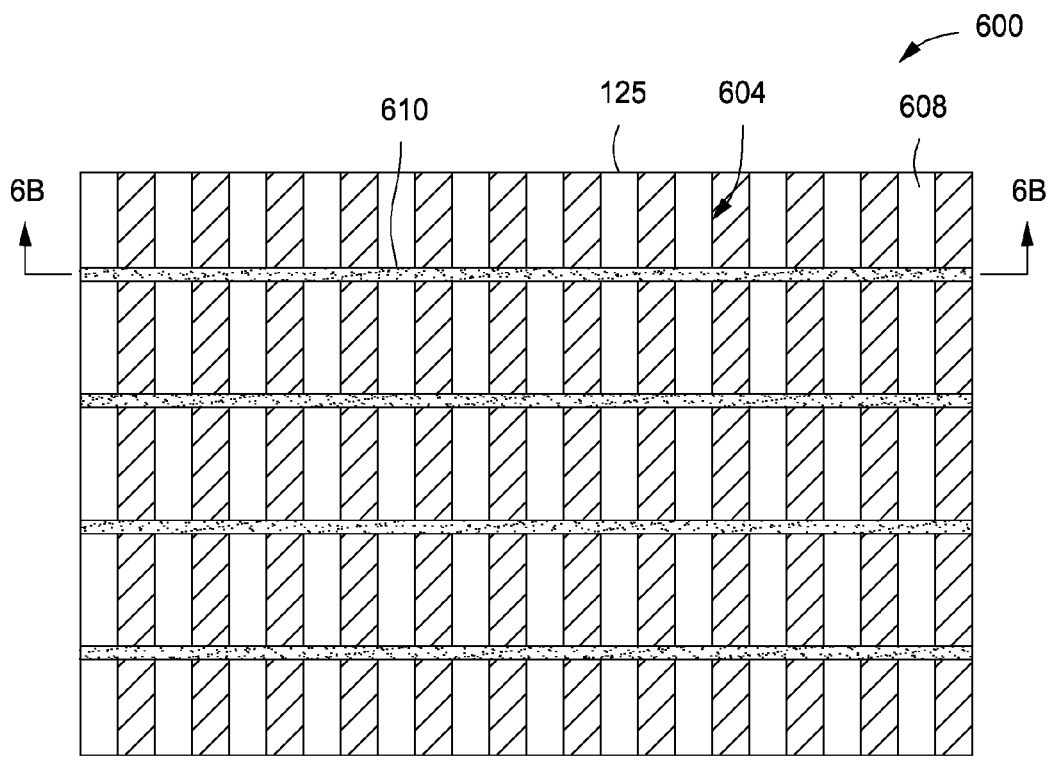
FIGS. 6A and 6B depict perspective views of an illustrative protection barrier that includes a sizing layer, a paperboard layer, an energy absorbing layer, and a plurality of support members, according to one or more embodiments described.
Figure 6B:
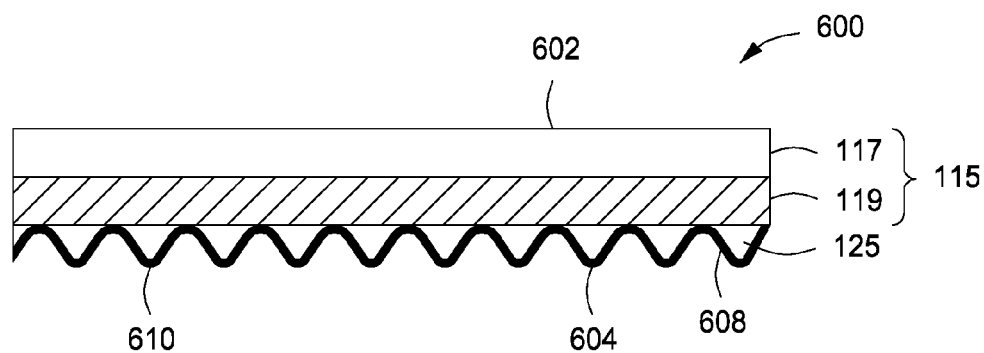

FIGS. 6A and 6B depict perspective views of illustrative protection barrier 600 having an upper surface 602 and a lower surface 604, according to one or more embodiments. FIG. 6A depicts the lower surface 604 of the protection barrier 600 and FIG. 6B depicts a cross-sectional view, as referenced in 6A, of the protection barrier 600. The protection barrier 600 can include the base sheet 115, the at least one layer 117, the at least one sizing layer 119, and the energy absorbing layer 125, as discussed and described above with reference to the protection barrier 100. The protection barrier 600 or portions thereof depicted in FIGS. 6A and 6B and the protection barrier 100 or portions thereof depicted in FIG. 1 share many common components. It should be noted that like numerals shown in the Figures and discussed herein represent like components throughout the multiple embodiments disclosed herein.

The lower surface 604 of the protection barrier 600 can include a plurality of flutes 608 extending in a vertical or substantially vertical direction within the energy absorbing layer 125, as depicted in FIG. 6A. The lower surface 604 can also include a plurality of support members 610 extending in a horizontal or substantially horizontal direction (e.g., perpendicular or substantially perpendicular to the flutes 608) within the energy absorbing layer 125. The support members 610 can provide physical support for the protection barrier 600. The support members 610 can also further reduce the contact area between the energy absorbing layer 125 and a surface to be protected can reduce the tendency or likelihood that the protection barrier 600 may cause scratches or other surface disruptions in a surface to be protected when located thereon.

The protection barrier 600 can have one support member 610, but generally can have multiple support members 610 disposed in or on the energy absorbing layer 125. The energy absorbing layer 125 can have about 5, about 10, or about 15 support members 610 per linear meter of the energy absorbing layer 125 to about 20, about 25, about 30, about 35, about 40, about 45, about 50, about 55, about 60, about 65, about 70, about 75, about 80, about 85, about 90, about 95, about 100, or more support members 610 per linear meter of the energy absorbing layer 125. For example, the energy absorbing layer 125 can have about 5 to about 50, about 10 to about 40, about 12 to about 30, or about 15 to about 25 support members 610 per linear meter of the energy absorbing layer 125.

Figure 7A:
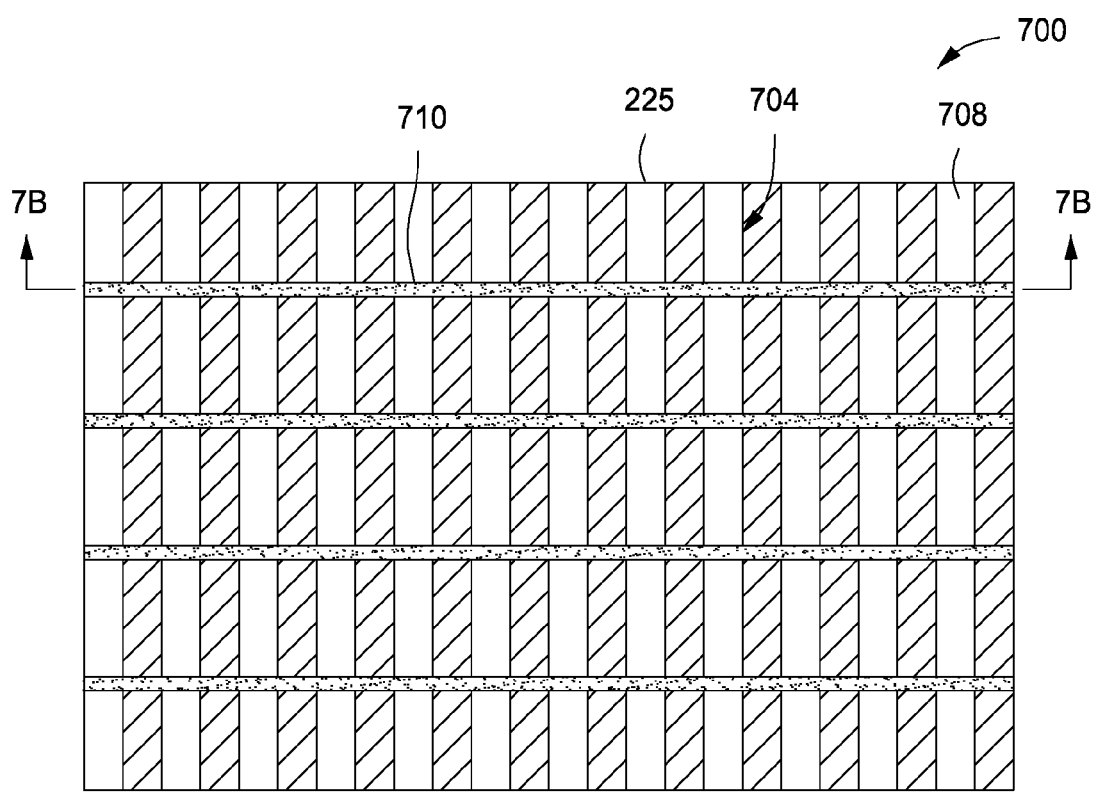
FIGS. 7A and 7B depict perspective views of an illustrative protection barrier that includes a sizing layer, at least two paperboard layers, an energy absorbing layer, and a plurality of support members, according to one or more embodiments described, according to one or more embodiments described.
Figure 7B:
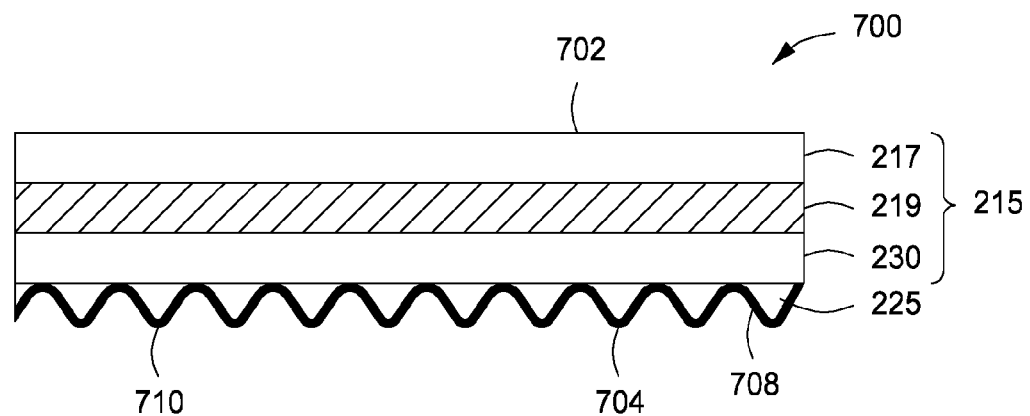

FIGS. 7A and 7B depict perspective views of illustrative protection barrier 700 having an upper surface 702 and a lower surface 704, according to one or more embodiments. FIG. 7A depicts the lower surface 704 of the protection barrier 700 and FIG. 7B depicts a cross-sectional view, as referenced in 7A, of the protection barrier 700. The protection barrier 700 can include the base sheet 215, the at least one layers 217 and 230, the at least one sizing layer 219, and the energy absorbing layer 225, as discussed and described above with reference to the protection barrier 200 (FIG. 2). The protection barrier 700 or portions thereof depicted in FIGS. 7A and 7B and the protection barrier 200 or portions thereof depicted in FIG. 2 share many common components. It should be noted that like numerals shown in the Figures and discussed herein represent like components throughout the multiple embodiments disclosed herein.

The lower surface 704 of the protection barrier 700 can include a plurality of flutes 708 extending in a vertical or substantially vertical direction within the energy absorbing layer 225, as depicted in FIG. 7A. The lower surface 704 can also include a plurality of support members 710 extending in a horizontal or substantially horizontal direction (e.g., perpendicular or substantially perpendicular to the flutes 708) within the energy absorbing layer 225. The support members 710 can provide physical support for the protection barrier 700. The support members 710 can also further reduce the contact area between the energy absorbing layer 225 and a surface to be protected can reduce the tendency or likelihood that the protection barrier 700 may cause scratches or other surface disruptions in a surface to be protected when located thereon.

The protection barrier 700 can have one support member 710, but generally can have multiple support members 710 disposed in or on the energy absorbing layer 225. In some examples, the energy absorbing layer 225 can have about 5, about 10, about 15, about 20, about 25, about 30, about 35, about 40, about 45, about 50, about 55, about 60, about 65, about 70, about 75, about 80, about 85, about 90, about 95, about 100, or more support members 710 per linear meter of the energy absorbing layer 225. In other examples, the energy absorbing layer 125 can have about 5 to about 50, about 10 to about 40, about 12 to about 30, or about 15 to about 25 support members 710 per linear meter of the energy absorbing layer 225.

Figure 8A:
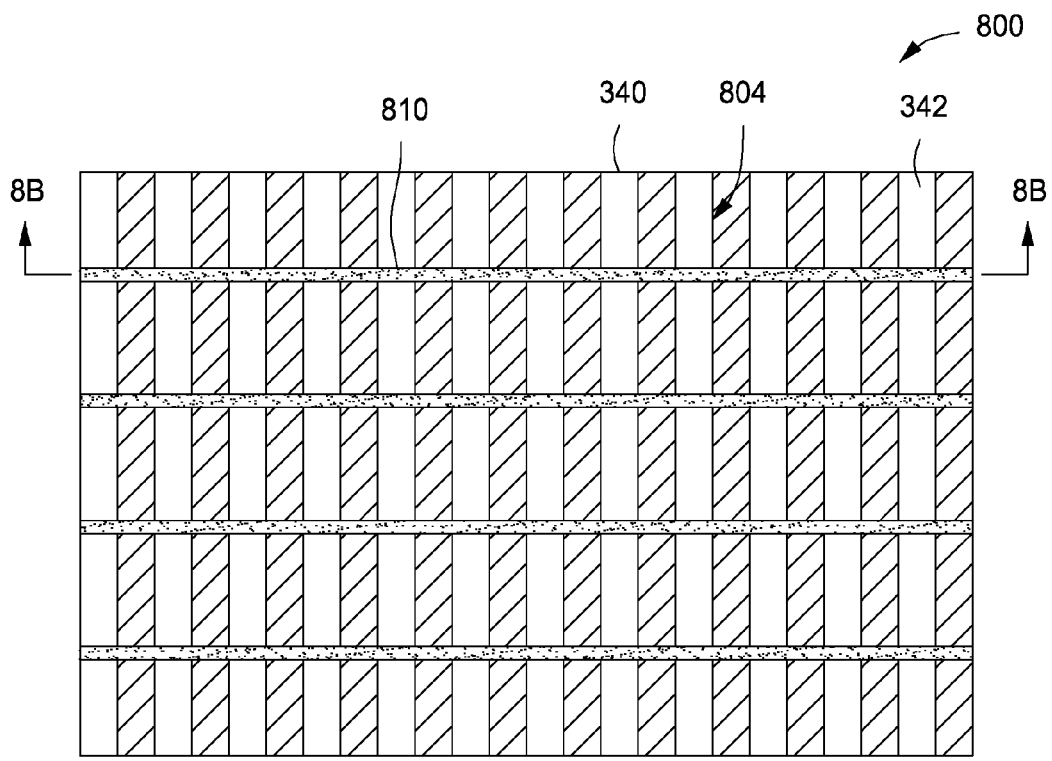
FIGS. 8A and 8B depict perspective views of an illustrative protection barrier that includes a sizing layer, at least five paperboard layers, an energy absorbing layer, and a plurality of support members, according to one or more embodiments described.
Figure 8B:
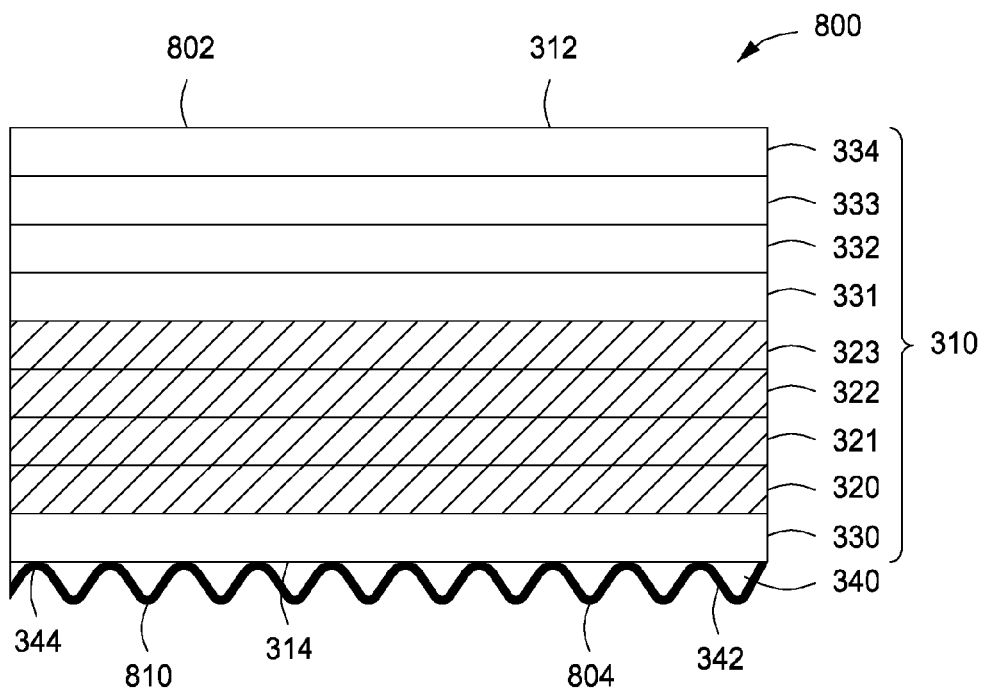

FIGS. 8A and 8B depict perspective views of illustrative protection barrier 800 having an upper surface 802 and a lower surface 804, according to one or more embodiments. FIG. 8A depicts the lower surface 804 of the protection barrier 800 and FIG. 8B depicts a cross-sectional view, as referenced in 8A, of the protection barrier 800. The protection barrier 800 can include the base sheet 310, one or more layers 330-334, one or more sizing layers 320-323, and the energy absorbing layer 340, as discussed and described above with reference to the protection barrier 300 (FIG. 3). The protection barrier 800 or portions thereof depicted in FIGS. 8A and 8B and the protection barrier 300 or portions thereof depicted in FIG. 3 share many common components. It should be noted that like numerals shown in the Figures and discussed herein represent like components throughout the multiple embodiments disclosed herein.

The lower surface 804 of the protection barrier 800 can include a plurality of flutes 342 extending in a vertical or substantially vertical direction within the energy absorbing layer 340, as depicted in FIG. 8A. The lower surface 804 can also include a plurality of support members 810 extending in a horizontal or substantially horizontal direction (e.g., perpendicular or substantially perpendicular to the flutes 342) within the energy absorbing layer 340. The support members 810 can provide physical support for the protection barrier 800. The support members 810 can also further reduce the contact area between the energy absorbing layer 340 and a surface to be protected can reduce the tendency or likelihood that the protection barrier 800 may cause scratches or other surface disruptions in a surface to be protected when located thereon.

The protection barrier 800 can have one support member 810, but generally can have multiple support members 810 disposed in or on the energy absorbing layer 340. In some examples, the energy absorbing layer 340 can have about 5, about 10, about 15, about 20, about 25, about 30, about 35, about 40, about 45, about 50, about 55, about 60, about 65, about 70, about 75, about 80, about 85, about 90, about 95, about 100, or more support members 810 per linear meter of the energy absorbing layer 340. In other examples, the energy absorbing layer 125 can have about 5 to about 50, about 10 to about 40, about 12 to about 30, or about 15 to about 25 support members 810 per linear meter of the energy absorbing layer 340.

Any of the protection barriers 100-800 can independently include one or more colorants. For example, a coating can be applied to at least one surface of the protection barriers 100-800. The coating can include at least one colorant to provide a desirable or visually appeasing fiberboard. The colorant can also provide heat transfer properties across the surface of the protection barriers 100-800 onto which applied, such as the upper surfaces 102, 202, 302, 402, 502, 602, 702, and/or 802 and the lower surfaces 104, 204, 304, 404, 504, 604, 704, and/or 804. The colorant can also be applied to or included in one or more of the layers 117, 217, 230, 330-334, 430-435, and/or 530-535, one or more of the sizing layers 119, 219, 320-323, 420, and/or 520, and/or one or more of the energy absorbing layers 125, 225, 340, 440, and/or 540.

The colorant can include one or more pigments, dyes, or mixtures thereof. The colorant can be in any suitable form, for example liquid, powder, granules, crystals, or any combination thereof. The colorant can be organic based, synthetic based, inorganic based, or any combination thereof. If a dye, the colorant can be dissolved in a solvent, which can be water, an alcohol, oil, lacquer, or any mixture thereof. If a pigment, the colorant can be suspended in a liquid, which can be water, oil, alcohol, lacquer, or any mixture thereof. Illustrative colorants can include, but are not limited to, clay, chalk, barite, silica, talc, bentonite, glass powder, alumina, titanium dioxide, graphite, carbon black, zinc sulfide, alumina silica, calcium carbonate, hollow glass spheres, organic spheres and any combination thereof. Illustrative clays can include, but are not limited to, kaolin clay, engineered clays, delaminated clays, structured clays, calcined clays, and combinations thereof The colorant can provide any desirable color. For example, the colorant can be green, brown, blue, red, yellow, white, orange, purple, pink, or shades thereof. An illustrative and commercially available colorant can include Keyazine Malachite Green from Keystone Aniline Corporation.

The protection barriers 100-800 can include about 0.001 wt % to about 10 wt % colorant, based on the total weight of the protection barriers 100-800. The colorant also can be present in an amount of about 0.01 wt %, 0.05 wt %, or 1.0 wt % to about 2.0 wt %, 5 wt %, or 10 wt %. The colorant can be present in an amount of about 0.3 wt %, 0.5 wt %, or 0.7 wt % to about 1.0 wt %, 1.5 wt %, or 2.5 wt %. The amount of colorant can also be about 0.01 wt % to about 2.5 wt %, about 0.3 wt % to about 2.0 wt %, about 0.5 wt % to about 1.5 wt %, or about 0.5 wt % to about 1.0 wt %.

The colorant can be uniformly dispersed or distributed about the coated surface of the protection barriers 100-800. For example, the colorant can cover at least 50% or more of the coated surface of the protection barriers 100-800. The colorant can cover at least 60%, at least 65%, at least 70%, at least 75%, at least 80%, at least 85%, at least 90%, at least 95%, at least 97%, or at least 99% of the coated surface of the protection barriers 100-800. The colorant dispersion can be about 20%, 30%, or 40% to about 70%, 85%, or 95% of the coated surface of the protection barriers 100-800. The colorant can cover about 20% to about 90%, about 30% to about 90%, about 50% to about 95%, or about 55% to about 90% of the coated surface of the protection barriers 100-800.

Furthermore, the colorant can provide a surface that evenly absorbs heat. The colorant can be used to better distribute heat about the surface of the protection barriers 100-800 so that hot spots do not develop in the surface of the protection barriers 100-800 when a light source, e.g., sunlight or light from a lamp, is directed toward the protection barriers 100-800.

In some examples, one or more protection barriers (e.g., any of the protection barriers 100-800) can be made and include a base sheet that can contain at least one paperboard layer and at least one sizing layer. One of the paperboard layers can form a first outer surface of the base sheet and one of the sizing layers can form a second outer surface of the base sheet. An energy absorbing layer can be attached or otherwise coupled to the paperboard layer which forms the first outer surface of the base sheet. A facing layer can be attached or otherwise coupled to the energy absorbing layer. The energy absorbing layer and the facing layer can be attached or otherwise coupled together, and then the combined layers via the energy absorbing layer can be attached or otherwise coupled to the first outer surface of the base sheet. In some examples, a scratch protective layer can be attached or otherwise coupled to the facing layer. In other examples, the scratch protective layer can be attached or otherwise coupled to the sizing layer forming the second outer surface of the base sheet.

One or more protection barriers (e.g., any of the protection barriers 100-800) can be installed by applying the protection barrier to one or more surfaces (e.g., a floor or a deck) in a building, house, or other structure. The surfaces, desired to be protected or otherwise at least partially covered by the protection barriers, can contain or include one or more materials, such as stone, rock, granite, quartz, terrazzo, marble, ceramic, concrete, colored concrete, brick, mortar, tile, masonry material, wood, plastic, linoleum, epoxy, glass, metal (e.g., copper, brass, stainless steel, aluminum, or alloys thereof), composite flooring, composite countertops, or any mixture thereof. The surfaces can be or part of one or more interior surfaces, exterior surfaces, or any other surface desired to be protected by one or more protection barrier (e.g., any of the protection barriers 100-800). The surfaces can be or part of one or more floors, decks, walls, countertops, cabinets, stairs, elevator interior surfaces, painted surfaces, concrete or cement surfaces, or any other surface desired to be protected by a protection barrier (e.g., any of the protection barriers 100-800). The surfaces can be or part of one or more driveways, sidewalks, walkways, decks, surfaces below structural or roof overhangs (e.g., where rain protection is available), or any other surface desired to be protected by a protection barrier (e.g., any of the protection barriers 100-800).

Embodiments of the present disclosure further relate to any one or more of the following paragraphs:

1. A protection barrier, comprising: a base sheet comprising a first paperboard layer, a second paperboard layer, and one or more sizing layers, wherein the first paperboard layer forms a first surface of the base sheet, the second paperboard layer forms a second surface of the base sheet, and the one or more sizing layers are disposed between the first and second paperboard layers; and an energy absorbing layer secured to the second paperboard layer, wherein: the protection barrier has a water vapor transmission rate of about 5 g/645.2 cm$^2$/24 hr to about 150 g/645.2 cm$^2$/24 hr, as measured according to ASTM E96M-14, Procedure A, the sizing layer has an average oil and grease resistance value of about 6 or greater, as measured according to TAPPI T-559 standard test for Grease Resistance for Paper and Paperboard, and the protection barrier has an oil and grease resistance flotation value of about 3 hours or greater, as measured according to the Georgia-Pacific Flotation Paper Saturation Test STP-415.

2. A protection barrier, comprising: a base sheet comprising one or more sizing layers disposed between two or more paperboard layers; and an energy absorbing layer secured to the base sheet, wherein: the protection barrier has a water vapor transmission rate of about 5 g/645.2 cm$^2$/24 hr to about 150 g/645.2 cm$^2$/24 hr, as measured according to ASTM E96M-14, Procedure A, the sizing layer has an average oil and grease resistance value of about 6 to 12, as measured according to TAPPI T-559 standard test for Grease Resistance for Paper and Paperboard, the protection barrier has an oil and grease resistance flotation value of about 3 hours to about 24, as measured according to the Georgia-Pacific Flotation Paper Saturation Test STP-415, the protection barrier has a thickness of about 0.2 mm to about 10 mm, the protection barrier has a width of about 0.25 m to about 4 m, and the protection barrier has a basis weight of about 300 g/m$^2$ to about 800 g/m$^2$.

3. A protection barrier, comprising: a base sheet comprising one or more paperboard layers and one or more sizing layers; and an energy absorbing layer secured to the base sheet.

4. A protection barrier, comprising: a base sheet comprising one or more sizing layers disposed between two or more paperboard layers, wherein a first paperboard layer of the two or more paperboard layers forms a first surface of the protection barrier; and an energy absorbing layer secured to the base sheet.

5. A protection barrier, comprising: a base sheet comprising two or more paperboard layers and one or more sizing layers, wherein a first paperboard layer forms a first surface of the base sheet and a second paperboard layer forms a second surface of the base sheet; and an energy absorbing layer secured to the second paperboard layer.

6. A protection barrier, comprising: a base sheet comprising one or more sizing layers disposed between two or more paperboard layers; and an energy absorbing layer secured to the base sheet, wherein: the protection barrier has a thickness of about 0.2 mm to about 2.5 mm, the protection barrier has a width of about 0.25 m to about 4 m, and the protection barrier has a basis weight of about 300 g/m$^2$ to about 800 g/m$^2$.

7. A protection barrier, comprising: a base sheet comprising one or more sizing layers disposed between two or more paperboard layers; and an energy absorbing layer secured to the base sheet, wherein the protection barrier has a water vapor transmission rate of about 5 g/645.2 cm$^2$/24 hr to about 150 g/645.2 cm$^2$/24 hr, as measured according to ASTM E96M-14 procedure A.

8. A protection barrier, comprising: a base sheet comprising at least one paperboard layer and at least one sizing layer; and at least one energy absorbing layer, wherein the sizing layer is disposed between the paperboard layer and the energy absorbing layer.

9. A protection barrier, comprising: a sizing layer; a facing layer; a plurality of paperboard layers disposed between the sizing layer and the facing layer; and an energy absorbing layer disposed between the plurality of paperboard layers and the facing layer.

10. A protection barrier, comprising: a sizing layer forming a first surface of the protection barrier; a facing layer forming a second surface of the protection barrier; a plurality of paperboard layers disposed between the sizing layer and the facing layer; and an energy absorbing layer disposed between the plurality of paperboard layers and the facing layer.

11. A protection barrier, comprising: a facing layer; a plurality of paperboard layers; and an energy absorbing layer disposed between the facing layer and the plurality of paperboard layers.

12. A protection barrier, comprising: a facing layer forming a first surface of the protection barrier; a scratch protective layer forming a second surface of the protection barrier; an energy absorbing layer disposed between the facing layer and the scratch protective layer; a plurality of paperboard layers disposed between the energy absorbing layer and the scratch protective layer; and a sizing layer disposed between the plurality of paperboard layers and the scratch protective layer.

13. A protection barrier, comprising: a base sheet comprising one or more layers and one or more sizing layers; and an energy absorbing layer secured to the base sheet.

14. A protection barrier, comprising: a base sheet comprising one or more sizing layers disposed between two or more other layers, wherein a first layer of the two or more other layers forms a first surface of the protection barrier; and an energy absorbing layer secured to the base sheet, wherein the energy absorbing layer forms a second surface of the protection barrier.

15. A protection barrier, comprising: a base sheet comprising two or more layers and one or more sizing layers, wherein a first layer of the two or more layers forms a first surface of the base sheet and a second layer of the two or more layers forms a second surface of the base sheet; and an energy absorbing layer secured to the second layer of the two or more layers.

16. A protection barrier, comprising: a base sheet comprising one or more sizing layers disposed between two or more other layers; and an energy absorbing layer secured to the base sheet, wherein: the protection barrier has a thickness of about 0.2 mm to about 2.5 mm, the protection barrier has a width of about 0.25 m to about 4 m, and the protection barrier has a basis weight of about 300 g/m$^2$ to about 800 g/m$^2$.

17. A protection barrier, comprising a base sheet comprising one or more sizing layers disposed between two or more other layers; and an energy absorbing layer secured to the base sheet, wherein the protection barrier has a water vapor transmission rate of about 5 g/645.2 cm$^2$/24 hr to about 150 g/645.2 cm$^2$/24 hr, as measured according to ASTM E96M-14, Procedure A.

18. A protection barrier, comprising: a base sheet comprising at least one layer and at least one sizing layer; and at least one energy absorbing layer, wherein the sizing layer is disposed between the at least one layer and the energy absorbing layer.

19. A method for making a protection barrier, comprising: forming a base sheet comprising a first paperboard layer, a second paperboard layer, and one or more sizing layers, wherein the first paperboard layer forms a first surface of the base sheet, the second paperboard layer forms a second surface of the base sheet, and the one or more sizing layers are disposed between the first and second paperboard layers; and securing an energy absorbing layer to the second paperboard layer, wherein: the protection barrier has a water vapor transmission rate of about 5 g/645.2 cm$^2$/24 hr to about 150 g/645.2 cm$^2$/24 hr, as measured according to ASTM E96M-14, Procedure A, the sizing layer has an average oil and grease resistance value of about 6 or greater, as measured according to TAPPI T-559 standard test for Grease Resistance for Paper and Paperboard, and the protection barrier has an oil and grease resistance flotation value of about 3 hours or greater, as measured according to the Georgia-Pacific Flotation Paper Saturation Test STP-415.

20. A method for making a protection barrier, comprising forming a base sheet comprising one or more paperboard layers and one or more sizing layers; and securing an energy absorbing layer to the base sheet.

21. A method for making a protection barrier, comprising: forming a base sheet comprising one or more sizing layers disposed between two or more paperboard layers, wherein a first paperboard layer of the two or more paperboard layers forms a first surface of the protection barrier; and securing an energy absorbing layer to a second paperboard layer of the two or more paperboard layers to form a second surface of the protection barrier.

22. A method for making a protection barrier, comprising: forming a base sheet comprising two or more paperboard layers and one or more sizing layers, wherein a first paperboard layer forms a first surface of the base sheet and a second paperboard layer forms a second surface of the base sheet; and securing an energy absorbing layer to the second paperboard layer.

23. A method for making a protection barrier, comprising forming a base sheet comprising one or more sizing layers disposed between two or more paperboard layers; and securing an energy absorbing layer to the base sheet, wherein the protection barrier has a thickness of about 0.2 mm to about 2.5 mm, the protection barrier has a width of about 0.25 m to about 4 m, and the protection barrier has a basis weight of about 300 g/m$^2$ to about 800 g/m$^2$.

24. A method for making a protection barrier, comprising forming a base sheet comprising one or more sizing layers disposed between two or more paperboard layers; and securing an energy absorbing layer to the base sheet, wherein the protection barrier has a water vapor transmission rate of about 5 g/645.2 cm$^2$/24 hr to about 150 g/645.2 cm$^2$/24 hr, as measured according to ASTM E96M-14, Procedure A.

25. A method for making a protection barrier, comprising: (A) forming a base sheet comprising at least one layer and at least one sizing layer, wherein one of the at least one layers forms a first outer surface of the base sheet and one of the sizing layers forms a second outer surface of the base sheet; attaching an energy absorbing layer to the one of the at least one layers that forms the first outer surface of the base sheet; and attaching a facing layer to the energy absorbing layer; or (B) forming a base sheet comprising at least one paperboard layer and at least one sizing layer, wherein one of the paperboard layers forms a first outer surface of the base sheet and one of the sizing layers forms a second outer surface of the base sheet; attaching an energy absorbing layer to the paperboard layer forming the first outer surface; and attaching a facing layer to the energy absorbing layer.

26. A method for making a protection barrier, comprising: (A) forming a base sheet comprising one or more layers and one or more sizing layers; and securing an energy absorbing layer to the base sheet; (B) forming a base sheet comprising one or more sizing layers disposed between two or more other layers, wherein a first layer of the two or more other layers forms a first surface of the protection barrier; and securing an energy absorbing layer to a second layer of the two or more other layers to form a second surface of the protection barrier; (C) forming a base sheet comprising two or more layers and one or more sizing layers, wherein a first layer of the two or more layers forms a first surface of the base sheet and a second layer of the two or more layers forms a second surface of the base sheet; and securing an energy absorbing layer to the second layer of the tow or more other layers; (D) forming a base sheet comprising one or more sizing layers disposed between two or more other layers; and securing an energy absorbing layer to the base sheet, wherein: the protection barrier has a thickness of about 0.2 mm to about 2.5 mm, the protection barrier has a width of about 0.25 m to about 4 m, and the protection barrier has a basis weight of about 300 g/m² to about 800 g/m²; or (E) forming a base sheet comprising one or more sizing layers disposed between two or more other layers; and securing an energy absorbing layer to the base sheet, wherein the protection barrier has a water vapor transmission rate of about 5 g/645.2 cm²/24 hr to about 150 g/645.2 cm²/24 hr, as measured according to ASTM E96M-14, Procedure A.

27. The protection barrier or method according to any one of paragraphs 1-26, wherein the sizing layer has an average oil and grease resistance value of about 8 to about 12, as measured according to TAPPI T-559 standard test for Grease Resistance for Paper and Paperboard.

28. The protection barrier or method according to any one of paragraphs 1-27, wherein the protection barrier has an oil and grease resistance flotation value of about 4 hours to about 24 hours, as measured according to the Georgia-Pacific Flotation Paper Saturation Test STP-415.

29. The protection barrier or method according to any one of paragraphs 1-28, wherein the protection barrier has an oil and grease resistance flotation value of greater than 24 hours, as measured according to the Georgia-Pacific Flotation Paper Saturation Test STP-415.

30. The protection barrier or method according to any one of paragraphs 1-29, wherein the protection barrier has a basis weight of about 400 g/m² to about 800 g/m².

31. The protection barrier or method according to any one of paragraphs 1-30, wherein an upper surface of the protection barrier comprises the first surface of the base sheet, and wherein a lower surface of the protection barrier comprises the energy absorbing layer.

32. The protection barrier or method according to any one of paragraphs 1-31, wherein the base sheet has a thickness of about 0.1 mm to about 5 mm, wherein the base sheet comprises up to about 10 paperboard layers, and wherein the base sheet comprises up to about 6 sizing layers.

33. The protection barrier or method according to any one of paragraphs 1-32, wherein each paperboard layer has a thickness of about 0.05 mm to about 2 mm, comprises natural fibers, synthetic fibers, recycled fibers, or any mixture thereof, and has a water absorbency of about 1 g of water per 1 g of the paperboard layer to about 7 g of water per 1 g of the paperboard layer, as measured according to the Cobb test for a time of 180 seconds and at a temperature of about 23° C.

34. The protection barrier or method according to any one of paragraphs 1-33, wherein the sizing layers has a thickness of about 0.05 mm to about 2 mm, comprises one or more sizing agents and natural fibers, synthetic fibers, recycled fibers, or any mixture thereof, and has a basis weight of about 20 g/m² to about 80 g/m².

35. The protection barrier or method according to any one of paragraphs 1-34, wherein the sizing layer comprises one or more sizing agents, and wherein the one or more sizing agents comprise a clay-based material, a rosin, a latex, a latex-based material, starch, a modified starch, gelatin, a wax, an acrylic copolymer, an alkyl ketene dimer (AKD), an alkyl succinic anhydride (ASA), a polyamide-epihalohydrin (PAE), a styrene maleic anhydride (SMA), a styrene acrylic emulsion (SAE), a styrene acrylic acid (SAA), an ethylene acrylic acid (EAA), a polyurethane (PUR), or any mixture thereof 36. The protection barrier or method according to any one of paragraphs 1-35, wherein the energy absorbing layer has a thickness of about 0.05 mm to about 2 mm, comprises natural fibers, synthetic fibers, recycled fibers, or any mixture thereof, and has a basis weight of about 50 g/m² to about 400 g/m².

37. The protection barrier or method according to any one of paragraphs 1-36, wherein the energy absorbing layer comprises a corrugated layer having about 50 flutes per linear meter to about 1,000 flutes per linear meter.

38. The protection barrier or method according to any one of paragraphs 1-37, wherein the energy absorbing layer comprises a corrugated layer of size A flutes, size B flutes, size C flutes, size E flutes, size F flutes, or any combination thereof 39. The protection barrier or method according to any one of paragraphs 1-38, wherein the energy absorbing layer comprises a plurality of flutes and a plurality of support members, wherein the flutes and the support members extend along the lower surface of the energy absorbing layer, and wherein the flutes and the support members are substantially perpendicular to each other.

40. The protection barrier or method according to any one of paragraphs 1-39, wherein the energy absorbing layer comprises about 5 to about 50 support members per linear meter of the energy absorbing layer.

41. The protection barrier or method according to any one of paragraphs 1-40, wherein at least one of the first paperboard layer, the second paperboard layer, the one or more sizing layers, or the energy absorbing layer comprises a wet strengthening agent, and wherein the wet strengthening agent comprises a polyamide-epihalohydrin (PAE) resin, styrene maleic anhydrides (SMA), styrene maleimides (SMI), or any mixture thereof 42. The protection barrier or method according to any one of paragraphs 1-41, further comprising an adhesive layer disposed between the base sheet and the energy absorbing layer, and wherein the adhesive layer comprises a starch-based adhesive, an isocyanate resin, a urea-formaldehyde resin, a phenol formaldehyde resin, a melamine formaldehyde resin, a phenol-urea-formaldehyde resin, a resorcinol-formaldehyde resin, a phenol-resorcinol-formaldehyde resin, a melamine-urea-formaldehyde resin, or any mixture thereof.

43. The protection barrier or method according to any one of paragraphs 1-42, wherein at least one of the first paperboard layer, the second paperboard layer, the one or more sizing layers, or the energy absorbing layer comprises a fire retardant agent, and wherein the fire retardant agent comprises styrene butadiene, vinyl acetate ethylene copolymer, latex, aluminum trihydrate, aluminum hydroxide, alumina trihydrate, clay, calcium carbonate, or any mixture thereof.

44. The protection barrier or method according to any one of paragraphs 1-43, wherein the energy absorbing layer is secured to a second paperboard layer of the two or more paperboard layers.

45. The protection barrier or method according to any one of paragraphs 1-44, wherein the one or more sizing layers are disposed between the first paperboard layer and the second paperboard layer.

46. The protection barrier or method according to any one of paragraphs 1-45, wherein the base sheet further comprises at least one second paperboard layer.

47. The protection barrier or method according to any one of paragraphs 1-46, wherein the second paperboard layer is disposed between the sizing layer and the energy absorbing layer.

48. The protection barrier or method according to any one of paragraphs 1-47, wherein a first paperboard layer of the paperboard layers forms a first surface of the protection barrier and the energy absorbing layer forms a second surface of the protection barrier.

49. The protection barrier or method according to any one of paragraphs 1-48, wherein the energy absorbing layer comprises hardwood fibers.

50. The protection barrier or method according to any one of paragraphs 1-49, wherein the energy absorbing layer comprises an open cell foam, a closed cell foam, an embossed layer composed of fibers, or any combination thereof 51. The protection barrier or method according to any one of paragraphs 1-50, wherein the energy absorbing layer comprises: at least one corrugated cardboard layer comprising a sizing agent; at least one corrugated polymeric or oligomeric layer; or combinations thereof.

52. The protection barrier or method according to any one of paragraphs 1-51, wherein the energy absorbing layer comprises a sizing agent or a polymeric material, and wherein the energy absorbing layer has a water vapor transmission rate of about 5 g/645.2 $cm^2$/24 hr to about 150 g/645.2 $cm^2$/24 hr, as measured according to ASTM E96M-14, Procedure A.

53. The protection barrier or method according to any one of paragraphs 1-52, wherein the energy absorbing layer comprises: at least one corrugated cardboard layer and a sizing agent; at least one corrugated polymeric or oligomeric layer; or a combination thereof 54. The protection barrier or method according to any one of paragraphs 1-53, wherein the energy absorbing layer comprises a sizing agent or a polymeric material, and wherein the energy absorbing layer has a water vapor transmission rate of about 5 g/645.2 $cm^2$/24 hr to about 150 g/645.2 $cm^2$/24 hr, as measured according to ASTM E96M-14, Procedure A.

55. The protection barrier or method according to any one of paragraphs 1-54, wherein the plurality of paperboard layers is consecutively disposed on one another.

56. The protection barrier or method according to any one of paragraphs 1-55, further comprising a plurality of adhesive layers, wherein each of the paperboard layers and each of the adhesive layers are sequentially disposed on one another.

57. The protection barrier or method according to any one of paragraphs 1-56, wherein the adhesive layers comprises a starch-based adhesive, an isocyanate resin, a urea-formaldehyde resin, a phenol formaldehyde resin, a melamine formaldehyde resin, a phenol-urea-formaldehyde resin, a resorcinol-formaldehyde resin, a phenol-resorcinol-formaldehyde resin, a melamine-urea-formaldehyde resin, or any mixture thereof.

58. The protection barrier or method according to any one of paragraphs 1-57, wherein the facing layer comprises gypsum wallboard facing paper, cardboard, paperboard, kraft paper, manila paper, newsliner paper, nylon, polyester, polypropylene, polyethylene, rayon, or any combination thereof.

59. The protection barrier or method according to any one of paragraphs 1-58, wherein the facing layer has a thickness of about 0.05 mm to about 2 mm.

60. The protection barrier or method according to any one of paragraphs 1-59, wherein the facing layer has a basis weight of about 50 g/$m^2$ to 500 g/$m^2$.

61. The protection barrier or method according to any one of paragraphs 1-60, further comprising a scratch protective layer disposed below the facing layer on the second surface.

62. The protection barrier or method according to any one of paragraphs 1-61, wherein the scratch protective layer has a Mohs hardness of about 2 or less.

63. The protection barrier or method according to any one of paragraphs 1-62, wherein the scratch protective layer has a thickness of about 0.05 mm to about 2 mm.

64. The protection barrier or method according to any one of paragraphs 1-63, wherein the scratch protective layer has a basis weight of about 1 g/$m^2$ to about 150 g/$m^2$.

65. The protection barrier or method according to any one of paragraphs 1-64, wherein the scratch protective layer has a water vapor transmission rate of about 5 g/645.2 $cm^2$/24 hr to about 150 g/645.2 $cm^2$/24 hr, as measured according to ASTM E96M-14, Procedure A.

66. The protection barrier or method according to any one of paragraphs 1-65, wherein the scratch protective layer comprises natural fibers, synthetic fibers, recycled fibers, or any mixture thereof 67. The protection barrier or method according to any one of paragraphs 1-66, wherein the scratch protective layer comprises one or more of the following: an airlaid material or fabric; a cross-woven polyolefin wrap that provides a water and air resistant barrier; a mixture of about 5 wt % to about 95 wt % cellulosic fibers and about 5 wt % to about 95 wt % polymer fibers, and the polymer fibers are bicomponent fibers having an inner core comprising a first polymer and an outer layer comprising a second polymer, and wherein the first polymer and the second polymer are different from one another; a mixture of cellulosic fibers and polymer fibers, wherein the polymer fibers comprise bicomponent fibers, wherein the bicomponent fibers comprise a sheath and a core, wherein the sheath comprises a first polymer and a melt additive, wherein the core comprises a second polymer, wherein the first and second polymers are different, and wherein a melting point of the first polymer is less than a melting point of the second polymer; or a non-woven sheet comprising a mixture of cellulosic fibers and polymer fibers, wherein the cellulosic fibers are present in an amount of about 5 wt % to about 95 wt %, based on the combined weight of the cellulosic fibers and the polymer fibers.

68. The protection barrier or method according to any one of paragraphs 1-67, further comprising a scratch protective layer.

69. The protection barrier or method according to any one of paragraphs 1-68, further comprising one or more adhesives disposed between: the sizing layer and an upper paperboard layer of the plurality of paperboard layers; a lower paperboard layer of the plurality of paperboard layers and the energy absorbing layer; or the energy absorbing layer and the facing layer.

70. The protection barrier or method according to any one of paragraphs 1-69, further comprising one or more adhesives disposed between: the facing layer and an upper paperboard layer of the plurality of paperboard layers; or a lower paperboard layer of the plurality of paperboard layers and the energy absorbing layer.

71. The protection barrier or method according to any one of paragraphs 1-70, further comprising one or more adhesives disposed between: the facing layer and the energy absorbing layer; the energy absorbing layer and an upper paperboard layer of the plurality of paperboard layers; a lower paperboard layer of the plurality of paperboard layers and the sizing layer; or the sizing layer and the scratch protective layer.

72. The protection barrier or method according to any one of paragraphs 1-71, wherein the energy absorbing layer and the facing layer are attached together before attaching the energy absorbing layer to the paperboard layer.

73. The protection barrier or method according to any one of paragraphs 1-72, wherein the energy absorbing layer is attached to the paperboard layer before attaching the facing layer to the energy absorbing layer.

74. The protection barrier or method according to any one of paragraphs 1-73, further comprising attaching a scratch protective layer to the facing layer.

75. The protection barrier or method according to any one of paragraphs 1-74, further comprising attaching a scratch protective layer to the sizing layer forming the second outer surface.

76. The protection barrier or method according to any one of paragraphs 1-75, wherein the energy absorbing layer is secured to a second layer of the two or more other layers.

77. The protection barrier or method according to any one of paragraphs 1-76, wherein the one or more sizing layers are disposed between the first layer and the second layer.

78. The protection barrier or method according to any one of paragraphs 1-77, wherein the base sheet further comprises at least one second layer.

79. The protection barrier or method according to any one of paragraphs 1-78, wherein the at least one second layer is disposed between the sizing layer and the energy absorbing layer.

80. The protection barrier or method according to any one of paragraphs 1-79, wherein the energy absorbing layer comprises a corrugated layer having a plurality of flutes.

81. The protection barrier or method according to any one of paragraphs 1-80, wherein the energy absorbing layer comprises open cell foam.

82. The protection barrier or method according to any one of paragraphs 1-81, wherein the energy absorbing layer comprises closed cell foam.

83. The protection barrier or method according to any one of paragraphs 1-82, wherein the energy absorbing layer comprises an embossed layer composed of fibers.

84. The protection barrier or method according to any one of paragraphs 1-83, wherein the energy absorbing layer has a surface area that is about 25% to about 90% less than a surface area of the base sheet.

85. The protection barrier or method according to any one of paragraphs 1-84, wherein the sizing layer comprises an oil and grease resistance value or an average oil and grease resistance value of about 6 or greater, as measured according to TAPPI T-559 standard test for Grease Resistance for Paper and Paperboard.

86. The protection barrier or method according to any one of paragraphs 1-85, wherein the sizing layer comprises an oil and grease resistance value or an average oil and grease resistance value of about 8 to about 12, as measured according to TAPPI T-559 standard test for Grease Resistance for Paper and Paperboard.

87. The protection barrier or method according to any one of paragraphs 1-86, wherein the protection barrier comprises an oil and grease resistance flotation value of about 4 hours to about 24 hours, as measured according to the Georgia-Pacific Flotation Paper Saturation Test STP-415.

88. The protection barrier or method according to any one of paragraphs 1-87, wherein the protection barrier comprises an oil and grease resistance flotation value of greater than 24 hours, as measured according to the Georgia-Pacific Flotation Paper Saturation Test STP-415.

89. The protection barrier or method according to any one of paragraphs 1-88, wherein the energy absorbing layer comprises a plurality of support members.

90. The protection barrier or method according to any one of paragraphs 1-89, wherein the energy absorbing layer comprises a plurality of flutes and a plurality of support members.

91. The protection barrier or method according to any one of paragraphs 1-90, wherein the energy absorbing layer comprises a plurality of flutes and a plurality of support members, and wherein the flutes and the support members extend along the lower surface of the energy absorbing layer and the flutes and the support members are at least substantially perpendicular to each other.

92. The protection barrier or method according to any one of paragraphs 1-91, wherein the energy absorbing layer comprises 5 or more support members per linear meter of the energy absorbing layer.

93. The protection barrier or method according to any one of paragraphs 1-92, wherein the energy absorbing layer comprises about 5 to about 50 support members per linear meter of the energy absorbing layer.

94. The protection barrier or method according to any one of paragraphs 1-93, wherein the protection barrier comprises one or more colorants.

95. The protection barrier or method according to any one of paragraphs 1-94, wherein one or more of the base sheet, the sizing layer, or the energy absorbing layer comprises one or more colorants.

96. The protection barrier or method according to any one of paragraphs 1-95, wherein each paperboard layer has a water absorbency of about 1 g of water per 1 g of the paperboard layer to about 7 g of water per 1 g of the paperboard layer, as measured according to the Cobb test for a time of 180 seconds and at a temperature of about 23° C.

97. A method of installing the protection barrier according to any one of paragraphs 1-96, comprising applying, positioning, adjusting, and/or disposing the protection barrier onto a surface in a building or other structure.

98. The method of claim 97, wherein the surface is one or more floors, decks, walls, countertops, cabinets, stairs, elevator interior surfaces, painted surfaces, concrete surfaces, or cement surfaces.

99. The method of claim 97, wherein the surface comprises one or more of stone, rock, granite, quartz, terrazzo, marble, ceramic, concrete, colored concrete, brick, mortar, tile, masonry material, wood, plastic, linoleum, glass, metal, composite flooring, composite countertops, or any mixture thereof 100. The method of claim 97, wherein the surface is made of a material comprising at least one of: wood, engineered wood, tile, ceramic, cork, glass, or stone.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A protection barrier, comprising:
a base sheet comprising a first paperboard layer, a second paperboard layer, and one or more sizing layers, wherein the first paperboard layer forms a first surface of the base sheet, the second paperboard layer forms a second surface of the base sheet, and the one or more sizing layers are disposed between the first and second paperboard layers; and
an energy absorbing layer secured to the second paperboard layer, wherein:
the protection barrier has a water vapor transmission rate of about 5 g/645.2 cm$^2$/24 hr to about 150 g/645.2 cm$^2$/24 hr, as measured according to ASTM E96M-14, Procedure A,
the sizing layer has an average oil and grease resistance value of about 6 or greater, as measured according to TAPPI T-559 standard test for Grease Resistance for Paper and Paperboard, and
the protection barrier has an oil and grease resistance flotation value of about 3 hours or greater, as measured according to the Georgia-Pacific Flotation Paper Saturation Test STP-415.

2. The protection barrier of claim 1, wherein the sizing layer has an average oil and grease resistance value of about 8 to about 12, as measured according to TAPPI T-559 standard test for Grease Resistance for Paper and Paperboard.

3. The protection barrier of claim 1, wherein the protection barrier has an oil and grease resistance flotation value of about 4 hours to about 24 hours, as measured according to the Georgia-Pacific Flotation Paper Saturation Test STP-415.

4. The protection barrier of claim 1, wherein the protection barrier has a basis weight of about 400 g/m$^2$ to about 800 g/m$^2$, and wherein the protection barrier has an oil and grease resistance flotation value of greater than 24 hours, as measured according to the Georgia-Pacific Flotation Paper Saturation Test STP-415.

5. The protection barrier of claim 1, wherein an upper surface of the protection barrier comprises the first surface of the base sheet, and wherein a lower surface of the protection barrier comprises the energy absorbing layer.

6. The protection barrier of claim 1, wherein the base sheet has a thickness of about 0.1 mm to about 5 mm.

7. The protection barrier of claim 1, wherein the base sheet comprises up to about 10 paperboard layers, and wherein the base sheet comprises up to about 6 sizing layers.

8. The protection barrier of claim 1, wherein each paperboard layer has a thickness of about 0.05 mm to about 2 mm, comprises natural fibers, synthetic fibers, recycled fibers, or any mixture thereof, and has a water absorbency of about 1 g of water per 1 g of the paperboard layer to about 7 g of water per 1 g of the paperboard layer at about 23° C.

9. The protection barrier of claim 1, wherein the sizing layers has a thickness of about 0.05 mm to about 2 mm, comprises one or more sizing agents and natural fibers, synthetic fibers, recycled fibers, or any mixture thereof, and has a basis weight of about 20 g/m$^2$ to about 80 g/m$^2$.

10. The protection barrier of claim 1, wherein the sizing layer comprises one or more sizing agents, and wherein the one or more sizing agents comprise a clay-based material, a rosin, a latex, a latex-based material, starch, a modified starch, gelatin, a wax, an acrylic copolymer, an alkyl ketene dimer (AKD), an alkyl succinic anhydride (ASA), a polyamide-epihalohydrin (PAE), a styrene maleic anhydride (SMA), a styrene acrylic emulsion (SAE), a styrene acrylic acid (SAA), an ethylene acrylic acid (EAA), a polyurethane (PUR), or any mixture thereof.

11. The protection barrier of claim 1, wherein the energy absorbing layer has a thickness of about 0.05 mm to about 2 mm, comprises natural fibers, synthetic fibers, recycled fibers, or any mixture thereof, and has a basis weight of about 50 g/m$^2$ to about 400 g/m$^2$.

12. The protection barrier of claim 1, wherein the energy absorbing layer comprises a corrugated layer having about 50 flutes per linear meter to about 1,000 flutes per linear meter.

13. The protection barrier of claim 1, wherein the energy absorbing layer comprises a corrugated layer of size A flutes, size B flutes, size C flutes, size E flutes, size F flutes, or any combination thereof.

14. The protection barrier of claim 1, wherein the energy absorbing layer comprises a plurality of flutes and a plurality of support members, wherein the flutes and the support members extend along the lower surface of the energy absorbing layer, wherein the flutes and the support members are substantially perpendicular to each other, and wherein the energy absorbing layer comprises about 5 to about 50 support members per linear meter of the energy absorbing layer.

15. The protection barrier of claim 1, wherein an upper surface of the protection barrier comprises the first surface of the base sheet, wherein a lower surface of the protection barrier comprises the energy absorbing layer, wherein the energy absorbing layer comprises a corrugated layer having about 50 flutes per linear meter to about 1,000 flutes per linear meter, and wherein the energy absorbing layer comprises a corrugated layer of size A flutes, size B flutes, size C flutes, size E flutes, size F flutes, or any combination thereof.

16. The protection barrier of claim 1, wherein at least one of the first paperboard layer, the second paperboard layer, the one or more sizing layers, or the energy absorbing layer comprises a wet strengthening agent, and wherein the wet strengthening agent comprises a polyamide-epihalohydrin (PAE) resin, styrene maleic anhydrides (SMA), styrene maleimides (SMI), or any mixture thereof.

17. The protection barrier of claim 1, further comprising an adhesive layer disposed between the base sheet and the energy absorbing layer, and wherein the adhesive layer comprises a starch-based adhesive, an isocyanate resin, a urea-formaldehyde resin, a phenol formaldehyde resin, a melamine formaldehyde resin, a phenol-urea-formaldehyde resin, a resorcinol-formaldehyde resin, a phenol-resorcinol-formaldehyde resin, a melamine-urea-formaldehyde resin, or any mixture thereof.

18. The protection barrier of claim 1, wherein at least one of the first paperboard layer, the second paperboard layer, the one or more sizing layers, or the energy absorbing layer comprises a fire retardant agent, and wherein the fire retardant agent comprises styrene butadiene, vinyl acetate ethylene copolymer, latex, aluminum trihydrate, aluminum hydroxide, alumina trihydrate, clay, calcium carbonate, or any mixture thereof.

19. A protection barrier, comprising:
a base sheet comprising one or more sizing layers disposed between two or more paperboard layers; and
an energy absorbing layer secured to the base sheet, wherein:
the protection barrier has a water vapor transmission rate of about 5 g/645.2 cm$^2$/24 hr to about 150 g/645.2 cm$^2$/24 hr, as measured according to ASTM E96M-14, Procedure A,
the sizing layer has an average oil and grease resistance value of about 6 to 12, as measured according to TAPPI T-559 standard test for Grease Resistance for Paper and Paperboard,
the protection barrier has an oil and grease resistance flotation value of about 3 hours to about 24, as measured according to the Georgia-Pacific Flotation Paper Saturation Test STP-415,
the protection barrier has a thickness of about 0.2 mm to about 10 mm,
the protection barrier has a width of about 0.25 m to about 4 m, and
the protection barrier has a basis weight of about 300 g/m$^2$ to about 800 g/m$^2$.

20. A method for making a protection barrier, comprising:
forming a base sheet comprising a first paperboard layer, a second paperboard layer, and one or more sizing layers, wherein the first paperboard layer forms a first surface of the base sheet, the second paperboard layer forms a second surface of the base sheet, and the one or more sizing layers are disposed between the first and second paperboard layers; and
securing an energy absorbing layer to the second paperboard layer, wherein:
the protection barrier has a water vapor transmission rate of about 5 g/645.2 cm$^2$/24 hr to about 150 g/645.2 cm$^2$/24 hr, as measured according to ASTM E96M-14, Procedure A,
the sizing layer has an average oil and grease resistance value of about 6 or greater, as measured according to TAPPI T-559 standard test for Grease Resistance for Paper and Paperboard, and
the protection barrier has an oil and grease resistance flotation value of about 3 hours or greater, as measured according to the Georgia-Pacific Flotation Paper Saturation Test STP-415.

* * * * *